US012602356B2

(12) United States Patent
Buehne et al.

(10) Patent No.: US 12,602,356 B2
(45) Date of Patent: Apr. 14, 2026

(54) INTEGRATED TRANSITION CONTROL CENTER

(71) Applicant: Oracle International Corporation, Redwood Shores, CA (US)

(72) Inventors: Stephan Buehne, Essen (DE); Elmar Spiegelberg, Bedburg (DE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/981,089

(22) Filed: Dec. 13, 2024

(65) Prior Publication Data

US 2025/0110933 A1      Apr. 3, 2025

Related U.S. Application Data

(63) Continuation of application No. 18/490,664, filed on Oct. 19, 2023, now Pat. No. 12,174,804, which is a
(Continued)

(51) Int. Cl.
| | |
|---|---|
| *G06F 16/21* | (2019.01) |
| *G06F 16/182* | (2019.01) |
| *G06F 16/27* | (2019.01) |

(52) U.S. Cl.
CPC .......... *G06F 16/214* (2019.01); *G06F 16/182* (2019.01); *G06F 16/275* (2019.01)

(58) Field of Classification Search
CPC ..... G06F 16/214; G06F 16/182; G06F 16/275
(Continued)

(56) References Cited

U.S. PATENT DOCUMENTS

| | | | |
|---|---|---|---|
| 6,016,394 | A | 1/2000 | Walker |
| 6,185,625 | B1 | 2/2001 | Tso et al. |

(Continued)

FOREIGN PATENT DOCUMENTS

| | | |
|---|---|---|
| CN | 1545674 A | 11/2004 |
| CN | 1652087 A | 8/2005 |

(Continued)

OTHER PUBLICATIONS

International Search Report and Written Opinion for International Patent Application No. PCT/US2014/040692, mailed Oct. 8, 2014.
(Continued)

*Primary Examiner* — Cam Y T Truong
(74) *Attorney, Agent, or Firm* — Mughal Gaudry & Franklin PC

(57) ABSTRACT

Systems, methods, and machine-readable media to migrate data from source databases to target databases are disclosed. Data may be received, relating to the source databases and the target database. For each source database, a migration assessment may be generated based on analyzing the data, and a migration method may be selected. A migration plan that specifies a parallel migration of a set of databases to the target databases may be created, with a first migration method to migrate a first subset of the set of databases and a second migration method to migrate a second subset of the set of databases. The parallel migration may be executed according to the migration plan may be caused so that the first subset of the set of databases is migrated with the first migration method while the second subset of the set of databases is migrated with the second migration method.

20 Claims, 6 Drawing Sheets

Related U.S. Application Data continuation of application No. 17/580,196, filed on Jan. 20, 2022, now Pat. No. 11,822,526, which is a continuation of application No. 16/569,936, filed on Sep. 13, 2019, now Pat. No. 11,256,671.

(58) Field of Classification Search
USPC ........................................................ 707/634
See application file for complete search history.

(56) References Cited

U.S. PATENT DOCUMENTS

| | | | |
|---|---|---|---|
| 6,457,007 B1 | 9/2002 | Kikuchi et al. | |
| 6,477,483 B1 | 11/2002 | Scarlat et al. | |
| 6,604,110 B1 | 8/2003 | Savage et al. | |
| 6,615,220 B1 | 9/2003 | Austin et al. | |
| 6,738,811 B1 | 5/2004 | Liang | |
| 6,889,210 B1 | 5/2005 | Vainstein | |
| 6,973,489 B1 | 12/2005 | Levy | |
| 7,065,541 B2 | 6/2006 | Gupta et al. | |
| 7,177,866 B2 | 2/2007 | Holenstein et al. | |
| 7,290,003 B1 | 10/2007 | Tong | |
| 7,343,467 B2 | 3/2008 | Brown et al. | |
| 7,548,898 B1 | 6/2009 | Tarenskeen et al. | |
| 7,580,862 B1 | 8/2009 | Montelo et al. | |
| 7,620,665 B1 | 11/2009 | George et al. | |
| 7,693,983 B1 | 4/2010 | Gupta et al. | |
| 7,865,584 B2 | 1/2011 | Grossner et al. | |
| 7,886,028 B2 | 2/2011 | Kogoh | |
| 7,913,056 B2 | 3/2011 | Brown et al. | |
| 8,059,565 B2 | 11/2011 | Dholakia et al. | |
| 8,074,107 B2 | 12/2011 | Sivasubramanian et al. | |
| 8,150,811 B1 | 4/2012 | Tarenskeen et al. | |
| 8,175,863 B1 | 5/2012 | Ostermeyer et al. | |
| 8,271,757 B1 | 9/2012 | Chatterjee et al. | |
| 8,356,010 B2 | 1/2013 | Driesen | |
| 8,484,355 B1 | 7/2013 | Lochhead et al. | |
| 8,584,230 B2 | 11/2013 | Dillaway et al. | |
| 8,606,894 B1 | 12/2013 | Fremont et al. | |
| 8,639,989 B1 | 1/2014 | Sorenson, III et al. | |
| 8,924,353 B1 | 12/2014 | Patwardhan et al. | |
| 8,943,032 B1 | 1/2015 | Xu et al. | |
| 9,098,364 B2 | 8/2015 | Davis | |
| 9,176,773 B2 | 11/2015 | Fries et al. | |
| 9,401,904 B1 | 7/2016 | Hankins et al. | |
| 9,442,983 B2 | 9/2016 | Higginson et al. | |
| 9,479,394 B2 | 10/2016 | Lochhead et al. | |
| 9,491,072 B2 | 11/2016 | Raghunathan et al. | |
| 9,602,599 B2 | 3/2017 | Bhattacharya et al. | |
| 9,626,710 B1 | 4/2017 | Chheda et al. | |
| 9,736,013 B2 | 8/2017 | Markley et al. | |
| 9,747,311 B2 | 8/2017 | Buehne et al. | |
| 9,762,461 B2 | 9/2017 | Raghunathan et al. | |
| 9,792,321 B2 | 10/2017 | Buehne et al. | |
| 9,805,070 B2 | 10/2017 | Buehne et al. | |
| 9,811,527 B1 | 11/2017 | Esposito et al. | |
| 9,967,154 B2 | 5/2018 | Masterson et al. | |
| 9,996,562 B2 | 6/2018 | Higginson et al. | |
| 10,007,701 B2 | 6/2018 | Subramanian et al. | |
| 10,198,255 B2 | 2/2019 | Higginson et al. | |
| 10,248,671 B2 | 4/2019 | Buehne et al. | |
| 10,540,335 B2 | 1/2020 | Buehne et al. | |
| 10,691,654 B2 | 6/2020 | Higginson et al. | |
| 10,776,244 B2 | 9/2020 | Davis et al. | |
| 11,036,696 B2 | 6/2021 | Higginson et al. | |
| 11,157,664 B2 | 10/2021 | Higginson et al. | |
| 11,256,671 B2 | 2/2022 | Buehne et al. | |
| 2001/0029502 A1 | 10/2001 | Oeda | |
| 2001/0044795 A1 | 11/2001 | Cohen et al. | |
| 2002/0002578 A1 | 1/2002 | Yamashita | |
| 2002/0019826 A1 | 2/2002 | Tan | |
| 2002/0147645 A1 | 10/2002 | Alao et al. | |
| 2002/0177977 A1 | 11/2002 | Scarlat et al. | |
| 2002/0194329 A1 | 12/2002 | Alling | |
| 2002/0198984 A1 | 12/2002 | Goldstein et al. | |
| 2003/0028782 A1 | 2/2003 | Grundfest | |
| 2003/0037034 A1 | 2/2003 | Daniels et al. | |
| 2003/0066049 A1 | 4/2003 | Atwood et al. | |
| 2003/0069903 A1 | 4/2003 | Gupta et al. | |
| 2003/0192028 A1 | 10/2003 | Gusler et al. | |
| 2004/0098425 A1 | 5/2004 | Wiss et al. | |
| 2004/0153358 A1 | 8/2004 | Lienhart | |
| 2004/0167840 A1 | 8/2004 | Tully et al. | |
| 2004/0178261 A1 | 9/2004 | Potonniee et al. | |
| 2004/0181790 A1 | 9/2004 | Herrick | |
| 2004/0215664 A1 | 10/2004 | Hennings et al. | |
| 2004/0260875 A1 | 12/2004 | Murotani et al. | |
| 2005/0021567 A1 | 1/2005 | Holenstein et al. | |
| 2005/0055357 A1 | 3/2005 | Campbell | |
| 2005/0055446 A1 | 3/2005 | Chidambaran et al. | |
| 2005/0102318 A1 | 5/2005 | Odhner et al. | |
| 2005/0149582 A1 | 7/2005 | Wissmann et al. | |
| 2005/0204241 A1 | 9/2005 | Tamakoshi | |
| 2006/0059253 A1 | 3/2006 | Goodman et al. | |
| 2006/0112247 A1 | 5/2006 | Ramany et al. | |
| 2006/0156086 A1 | 7/2006 | Flynn et al. | |
| 2006/0173875 A1 | 8/2006 | Stefaniak | |
| 2006/0179171 A1 | 8/2006 | Stefaniak et al. | |
| 2006/0179431 A1 | 8/2006 | Devanathan et al. | |
| 2006/0235899 A1 | 10/2006 | Tucker | |
| 2006/0282825 A1 | 12/2006 | Taylor | |
| 2007/0028234 A1 | 2/2007 | Sero et al. | |
| 2007/0067847 A1 | 3/2007 | Wiemer et al. | |
| 2007/0089092 A1 | 4/2007 | Schmidt et al. | |
| 2007/0106710 A1 | 5/2007 | Haustein et al. | |
| 2007/0150488 A1 | 6/2007 | Barsness et al. | |
| 2007/0234346 A1 | 10/2007 | Kramer et al. | |
| 2007/0239774 A1 | 10/2007 | Bodily et al. | |
| 2007/0250829 A1 | 10/2007 | Hillier et al. | |
| 2007/0299892 A1 | 12/2007 | Nakahara | |
| 2008/0010233 A1 | 1/2008 | Sack et al. | |
| 2008/0148345 A1 | 6/2008 | Rubio | |
| 2008/0247320 A1 | 10/2008 | Grah et al. | |
| 2008/0313595 A1 | 12/2008 | Boulineau et al. | |
| 2009/0012981 A1 | 1/2009 | Kogoh | |
| 2009/0048993 A1 | 2/2009 | Lohrbach et al. | |
| 2009/0070733 A1 | 3/2009 | Huang et al. | |
| 2009/0070771 A1 | 3/2009 | Yuyitung et al. | |
| 2009/0113399 A1 | 4/2009 | Tzoref et al. | |
| 2009/0126022 A1 | 5/2009 | Sakaki | |
| 2009/0157864 A1 | 6/2009 | Kim | |
| 2009/0187413 A1 | 7/2009 | Abels et al. | |
| 2009/0210857 A1 | 8/2009 | Martineau | |
| 2009/0238078 A1 | 9/2009 | Robinson et al. | |
| 2009/0276771 A1 | 11/2009 | Nickolov et al. | |
| 2009/0313311 A1 | 12/2009 | Hoffmann et al. | |
| 2010/0005097 A1 | 1/2010 | Liang et al. | |
| 2010/0049851 A1 | 2/2010 | Garrison et al. | |
| 2010/0049934 A1 | 2/2010 | Tomita et al. | |
| 2010/0082543 A1 | 4/2010 | Nagarajan | |
| 2010/0191884 A1 | 7/2010 | Holenstein et al. | |
| 2010/0192156 A1 | 7/2010 | Hollingsworth | |
| 2010/0198799 A1 | 8/2010 | Krishnan et al. | |
| 2010/0262974 A1 | 10/2010 | Uyeda | |
| 2010/0293412 A1* | 11/2010 | Sakaguchi | G06F 11/0715 |
| | | | 711/E12.001 |
| 2011/0022711 A1 | 1/2011 | Cohn | |
| 2011/0093436 A1 | 4/2011 | Zha et al. | |
| 2011/0107327 A1 | 5/2011 | Barkie et al. | |
| 2011/0131174 A1 | 6/2011 | Birch et al. | |
| 2011/0161933 A1 | 6/2011 | Hudson | |
| 2011/0173327 A1 | 7/2011 | Chen et al. | |
| 2011/0246526 A1 | 10/2011 | Finkelstein et al. | |
| 2011/0251992 A1 | 10/2011 | Bethlehem et al. | |
| 2012/0017112 A1 | 1/2012 | Broda et al. | |
| 2012/0030407 A1 | 2/2012 | Pandey et al. | |
| 2012/0041933 A1 | 2/2012 | Driesen | |
| 2012/0096134 A1 | 4/2012 | Suit | |
| 2012/0102498 A1 | 4/2012 | Subramanya et al. | |
| 2012/0150642 A1 | 6/2012 | Kandanala et al. | |
| 2012/0158821 A1 | 6/2012 | Barros | |
| 2012/0221845 A1 | 8/2012 | Ferris | |
| 2012/0254435 A1 | 10/2012 | Zhaofu et al. | |
| 2012/0265726 A1 | 10/2012 | Padmanabhan et al. | |
| 2012/0284360 A1 | 11/2012 | Bense et al. | |

(56)                References Cited

U.S. PATENT DOCUMENTS

| | | |
|---|---|---|
| 2012/0297016 A1 | 11/2012 | Iyer et al. |
| 2012/0297059 A1 | 11/2012 | Bross |
| 2012/0303739 A1 | 11/2012 | Ferris |
| 2012/0311128 A1 | 12/2012 | Pechanec et al. |
| 2013/0067298 A1 | 3/2013 | Li et al. |
| 2013/0085742 A1 | 4/2013 | Barker et al. |
| 2013/0085989 A1 | 4/2013 | Nayyar et al. |
| 2013/0086130 A1 | 4/2013 | Wang et al. |
| 2013/0097651 A1 | 4/2013 | Rendahl et al. |
| 2013/0152050 A1 | 6/2013 | Chang et al. |
| 2013/0173546 A1 | 7/2013 | Cline et al. |
| 2013/0173547 A1 | 7/2013 | Cline et al. |
| 2013/0211559 A1 | 8/2013 | Lawson et al. |
| 2013/0268643 A1 | 10/2013 | Chang et al. |
| 2013/0268799 A1 | 10/2013 | Mestery et al. |
| 2013/0268800 A1 | 10/2013 | Rangaiah |
| 2013/0283364 A1 | 10/2013 | Chang et al. |
| 2013/0297802 A1 | 11/2013 | Laribi et al. |
| 2013/0311968 A1 | 11/2013 | Sharma |
| 2013/0318497 A1 | 11/2013 | Tal et al. |
| 2013/0326028 A1 | 12/2013 | Cox et al. |
| 2013/0339419 A1 | 12/2013 | Emaru |
| 2014/0007216 A1 | 1/2014 | Ahn |
| 2014/0012960 A1 | 1/2014 | Chien |
| 2014/0019212 A1 | 1/2014 | Lieblich et al. |
| 2014/0019961 A1 | 1/2014 | Neuse et al. |
| 2014/0059559 A1 | 2/2014 | Alatorre et al. |
| 2014/0068071 A1 | 3/2014 | Fremont et al. |
| 2014/0075031 A1 | 3/2014 | Doering et al. |
| 2014/0075033 A1 | 3/2014 | Doering et al. |
| 2014/0082689 A1 | 3/2014 | Christiaens et al. |
| 2014/0089495 A1 | 3/2014 | Akolkar et al. |
| 2014/0089809 A1 | 3/2014 | Levy et al. |
| 2014/0109053 A1 | 4/2014 | Vasudevan et al. |
| 2014/0129690 A1 | 5/2014 | Jaisinghani et al. |
| 2014/0136711 A1 | 5/2014 | Benari et al. |
| 2014/0172782 A1 | 6/2014 | Schuenzel et al. |
| 2014/0195636 A1 | 7/2014 | Karve et al. |
| 2014/0215045 A1 | 7/2014 | Wang et al. |
| 2014/0279890 A1 | 9/2014 | Srinivasan et al. |
| 2014/0337429 A1 | 11/2014 | Asenjo et al. |
| 2014/0344439 A1 | 11/2014 | Kempf et al. |
| 2014/0351636 A1 | 11/2014 | Yin et al. |
| 2014/0373011 A1 | 12/2014 | Anderson et al. |
| 2015/0019488 A1 | 1/2015 | Higginson et al. |
| 2015/0026153 A1 | 1/2015 | Gupta et al. |
| 2015/0058467 A1 | 2/2015 | Douglas et al. |
| 2015/0096011 A1 | 4/2015 | Watt |
| 2015/0264128 A1 | 9/2015 | Huang et al. |
| 2015/0302016 A1 | 10/2015 | Nam et al. |
| 2015/0331857 A1 | 11/2015 | Bhatia et al. |
| 2015/0355947 A1 | 12/2015 | Polkovnikov |
| 2015/0358392 A1 | 12/2015 | Ramalingam et al. |
| 2015/0363396 A1 | 12/2015 | Sengupta et al. |
| 2016/0269371 A1 | 9/2016 | Coimbatore |
| 2017/0046351 A1 | 2/2017 | Hasegawa et al. |
| 2017/0075709 A1 | 3/2017 | Feng et al. |
| 2017/0118244 A1 | 4/2017 | Bai et al. |
| 2017/0278012 A1 | 9/2017 | Prasad et al. |
| 2017/0315838 A1 | 11/2017 | Nidugala et al. |
| 2018/0157653 A1 | 6/2018 | Wadhwa et al. |
| 2018/0285353 A1 | 10/2018 | Rao et al. |
| 2018/0293233 A1* | 10/2018 | Higginson ............ G06F 16/214 |
| 2019/0121786 A1 | 4/2019 | Zhou et al. |
| 2019/0272386 A1 | 9/2019 | Ley |
| 2020/0336464 A1 | 10/2020 | Hastings |

FOREIGN PATENT DOCUMENTS

| | | |
|---|---|---|
| CN | 1734421 A | 2/2006 |
| CN | 1955965 A | 5/2007 |
| CN | 101084481 A | 12/2007 |
| CN | 101204042 A | 6/2008 |
| CN | 101266606 A | 9/2008 |
| CN | 101322113 A | 12/2008 |
| CN | 101473594 A | 7/2009 |
| CN | 101739275 A | 6/2010 |
| CN | 101919205 A | 12/2010 |
| CN | 102637143 A | 8/2012 |
| CN | 102656565 A | 9/2012 |
| CN | 102662757 A | 9/2012 |
| CN | 102982085 A | 3/2013 |
| CN | 103109271 A | 5/2013 |
| CN | 103176988 A | 6/2013 |
| CN | 103297492 A | 9/2013 |
| CN | 103530290 A | 1/2014 |
| CN | 105359102 A | 2/2016 |
| EP | 1611532 A2 | 1/2006 |
| EP | 2418591 A1 | 2/2012 |
| GB | 2468742 A | 9/2010 |
| JP | 2006277153 A | 10/2006 |
| JP | 2015056182 A | 3/2015 |
| WO | 9952047 A1 | 10/1999 |
| WO | 0153949 A1 | 7/2001 |
| WO | 2010030489 A2 | 3/2010 |
| WO | 2012047757 A1 | 4/2012 |
| WO | 2013072925 A2 | 5/2013 |
| WO | 2014032262 A1 | 3/2014 |
| WO | 2015191119 A1 | 12/2015 |

OTHER PUBLICATIONS

International Search Report and Written Opinion for International Patent Application No. PCT/US2014/045226, mailed Oct. 30, 2014.
International Search Report and Written Opinion for International Patent Application No. PCT/US2014/045240, mailed Oct. 21, 2014.
International Search Report and Written Opinion for International Patent Application No. PCT/US2014/045247, mailed Sep. 3, 2014.
International Search Report and Written Opinion for International Patent Application No. PCT/US2014/045282, mailed Sep. 18, 2014.
International Search Report and Written Opinion for International Patent Application No. PCT/US2014/045289, mailed Oct. 15, 2014.
International Search Report and Written Opinion for International Patent Application No. PCT/US2014/045721, mailed Nov. 4, 2014.
International Search Report and Written Opinion for International Patent Application No. PCT/US2014/045804, mailed Nov. 17, 2014.
International Search Report and Written Opinion for International Patent Application No. PCT/US2017/032620, mailed Jul. 28, 2017.
Laplante et al., "Pavlov's Bugs: Matching Repair Policies with Rewards", IEEE Computer Society, vol. 11, No. 4, Sep. 2009.
Leite et al., "Migratool: Towards a Web-Based Spatial Database Migration Tool", IEEE Computer Society, Proceedings of the 16th International Workshop on Database and Expert Systems Applications, Aug. 22, 2005.
Liang et al., "Automatic Construction of an Effective Training Set for Prioritizing Static Analysis Warnings", 25th IEEE/ACM International Conference on Automated Software Engineering, Sep. 20-24, 2010.
Miller, How to Score Customer Feedback/Bugs and Stores (for Agile), Configuration Management, May 17, 2013.
Non-Final Office Action for U.S. Appl. No. 13/937,970, mailed Jun. 26, 2017.
Non-Final Office Action for U.S. Appl. No. 13/937,970, mailed May 12, 2016.
Non-Final Office Action for U.S. Appl. No. 13/937,970, mailed May 5, 2015.
Non-Final Office Action for U.S. Appl. No. 13/937,977, mailed Aug. 12, 2014.
Non-Final Office Action for U.S. Appl. No. 13/937,977, mailed Aug. 19, 2015.
Non-Final Office Action for U.S. Appl. No. 13/937,988, mailed Sep. 1, 2016.
Non-Final Office Action for U.S. Appl. No. 13/938,061, mailed Aug. 18, 2016.
Non-Final Office Action for U.S. Appl. No. 13/938,061, mailed Aug. 8, 2018.
Non-Final Office Action for U.S. Appl. No. 13/938,066, mailed Dec. 17, 2014.

(56) References Cited

OTHER PUBLICATIONS

Non-Final Office Action for U.S. Appl. No. 15/250,522, mailed Mar. 1, 2018.

Non-Final Office Action for U.S. Appl. No. 15/175,213, mailed Jul. 11, 2018.

Non-Final Office Action for U.S. Appl. No. 15/175,213, mailed Sep. 19, 2019.

Non-Final Office Action for U.S. Appl. No. 15/175,213, mailed Sep. 22, 2020.

Non-Final Office Action for U.S. Appl. No. 15/670,473, mailed Dec. 18, 2018.

Non-Final Office Action for U.S. Appl. No. 15/789,049, mailed Feb. 2, 2018.

Non-Final Office Action for U.S. Appl. No. 16/003,557, mailed Sep. 5, 2019.

Non-Final Office Action for U.S. Appl. No. 16/569,936, mailed Apr. 13, 2021.

Non-Final Office Action for U.S. Appl. No. 18/490,664, dated May 7, 2024.

Non-Final Office Action for U.S. Appl. No. 13/937,344, mailed on Sep. 24, 2015.

Non-Final Office Action for U.S. Appl. No. 13/937,483, mailed on Aug. 12, 2016.

Non-Final Office Action for U.S. Appl. No. 13/937,483, mailed on Sep. 25, 2015.

Non-Final Office Action for U.S. Appl. No. 13/937,486, mailed on Jan. 11, 2016.

Non-Final Office Action for U.S. Appl. No. 13/937,486, mailed on Nov. 4, 2016.

Non-Final Office Action for U.S. Appl. No. 13/937,545, mailed on Feb. 7, 2017.

Non-Final Office Action for U.S. Appl. No. 13/937,545, mailed on Nov. 10, 2015.

Non-Final Office Action for U.S. Appl. No. 13/937,868, mailed on Apr. 5, 2017.

Non-Final Office Action for U.S. Appl. No. 13/937,868, mailed on Nov. 4, 2015.

Non-Final Office Action for U.S. Appl. No. 13/937,885, mailed on Aug. 10, 2018.

Non-Final Office Action for U.S. Appl. No. 13/937,885, mailed on Aug. 18, 2016.

Non-Final Office Action for U.S. Appl. No. 13/937,885, mailed on Jul. 29, 2020.

Notice of Allowance for U.S. Appl. No. 13/937,885, mailed Jun. 16, 2021.

Notice of Allowance for U.S. Appl. No. 13/937,970, mailed Dec. 28, 2017.

Notice of Allowance for U.S. Appl. No. 13/937,977, mailed Mar. 16, 2016.

Notice of Allowance for U.S. Appl. No. 13/937,988, mailed Apr. 27, 2017.

Notice of Allowance for U.S. Appl. No. 13/938,061, mailed May 26, 2020.

Notice of Allowance for U.S. Appl. No. 13/938,066, mailed Apr. 29, 2015.

Notice of Allowance for U.S. Appl. No. 15/250,522, mailed Aug. 14, 2018.

Advisory Action for U.S. Appl. No. 13/937,970, mailed Apr. 13, 2017.

Advisory Action for U.S. Appl. No. 13/938,061, mailed Jul. 26, 2017.

Advisory Action for U.S. Appl. No. 13/938,061, mailed May 24, 2019.

Advisory Action for U.S. Appl. No. 16/569,936, mailed Sep. 2, 2021.

Advisory Action for U.S. Appl. No. 13/937,483, mailed on May 12, 2016.

Advisory Action for U.S. Appl. No. 13/937,885, mailed on Jul. 31, 2019.

Applicant Initiated Interview Summary for U.S. Appl. No. 13/937,970, mailed Oct. 5, 2017.

Asabuki, "Part 4 New Classification of Cloud Service, IaaS and PaaS are Not Enough, Further Segmentation is Appropriate", Nikkei Systems, vol. 262, Feb. 2015.

Baysal et al., "A Bug You Like: A Framework for Automated Assignment of Bugs", IEEE 17th International Conference on Program Comprehension, May 17-19, 2009.

Buyukozkan et al., "Group Decision Making to Better Respond Customer Needs in Software Development", Computer & Industrial Engineering, vol. 48, No. 2, Mar. 2005.

Chanchary et al, "Data Migration: Connecting Databases in the Cloud", ICCIT, available online at http://www.chinacloud.cnjupload/2012-03/120333108076850.pdf, Jun. 28, 2012.

Charles, "Bug Severity vs. Priority", Quality Intelligence Blog, available online at http://quality-intelligence.blogspot.com/2010/08/bug-severity-vs-priority.html, Aug. 22, 2010.

Corrected Notice of Allowability for U.S. Appl. No. 13/937,977, mailed Jul. 18, 2016.

Corrected Notice of Allowability for U.S. Appl. No. 13/938,066, mailed Jun. 2, 2015.

Corrected Notice of Allowability for U.S. Appl. No. 15/250,522, mailed Jan. 11, 2019.

Corrected Notice of Allowability for U.S. Appl. No. 15/250,522, mailed Sep. 27, 2018.

Corrected Notice of Allowability for U.S. Appl. No. 13/937,344, mailed on Sep. 15, 2016.

Das et al., "Albatross: Lightweight Elasticity in Shared Storage Databases for the Cloud Using Live Data Migration", 37th International Conference on Very Large Data Bases, Proceedings of the VLDB Endowment, vol. 4, No. 8, available online at http://www.cs.ucsb.eduj-sudiptojpapers/albatross.pdf, Aug. 29, 2011.

Extended European Search Report for European Patent Application No. 18187354.8, mailed Sep. 12, 2018.

Final Office Action for U.S. Appl. No. 13/937,970, mailed Dec. 1, 2016.

Final Office Action for U.S. Appl. No. 13/937,970, mailed Dec. 10, 2015.

Final Office Action for U.S. Appl. No. 13/937,977, mailed Feb. 26, 2015.

Final Office Action for U.S. Appl. No. 13/938,061, mailed Mar. 23, 2017.

Final Office Action for U.S. Appl. No. 13/938,061, mailed Mar. 8, 2019.

Final Office Action for U.S. Appl. No. 15/175,213, mailed Feb. 6, 2020.

Final Office Action for U.S. Appl. No. 15/175,213, mailed Jan. 10, 2019.

Final Office Action for U.S. Appl. No. 15/175,213, mailed Mar. 21, 2019.

Final Office Action for U.S. Appl. No. 15/670,473, mailed Jun. 6, 2019.

Final Office Action for U.S. Appl. No. 15/789,049, mailed Sep. 6, 2018.

Final Office Action for U.S. Appl. No. 16/569,936, mailed Jul. 21, 2021.

Final Office Action for U.S. Appl. No. 13/937,344, mailed on Feb. 11, 2016.

Final Office Action for U.S. Appl. No. 13/937,483, mailed on Feb. 26, 2016.

Final Office Action for U.S. Appl. No. 13/937,486, mailed on Jul. 28, 2016.

Final Office Action for U.S. Appl. No. 13/937,545, mailed on May 13, 2016.

Final Office Action for U.S. Appl. No. 13/937,868, mailed on Apr. 22, 2016.

Final Office Action for U.S. Appl. No. 13/937,868, mailed on Oct. 27, 2017.

Final Office Action for U.S. Appl. No. 13/937,885, mailed on Feb. 4, 2021.

Final Office Action for U.S. Appl. No. 13/937,885, mailed on Mar. 21, 2019.

(56)         References Cited

OTHER PUBLICATIONS

Final Office Action for U.S. Appl. No. 13/937,885, mailed on May 19, 2017.
International Preliminary Report on Patentability for International Patent Application No. PCT/US2014/040486, mailed Oct. 1, 2015.
International Preliminary Report on Patentability for International Patent Application No. PCT/US2014/040692, mailed Oct. 8, 2015.
International Preliminary Report on Patentability for International Patent Application No. PCT/US2014/045226, mailed Jan. 21, 2016.
International Preliminary Report on Patentability for International Patent Application No. PCT/US2014/045240, mailed Jan. 21, 2016.
International Preliminary Report on Patentability for International Patent Application No. PCT/US2014/045247, mailed Jan. 21, 2016.
International Preliminary Report on Patentability for International Patent Application No. PCT/US2014/045282, mailed Jan. 21, 2016.
International Preliminary Report on Patentability for International Patent Application No. PCT/US2014/045289, mailed Jan. 21, 2016.
International Preliminary Report on Patentability for International Patent Application No. PCT/US2014/045721, mailed Jan. 21, 2016.
International Preliminary Report on Patentability for International Patent Application No. PCT/US2014/045804, mailed Jan. 21, 2016.
International Preliminary Report on Patentability for International Patent Application No. PCT/US2017/032620, mailed Dec. 20, 2018.
International Search Report and Written Opinion for International Patent Application No. PCT/US2014/040486, mailed Sep. 29, 2014.
Notice of Allowance for U.S. Appl. No. 15/175,213, mailed Feb. 18, 2021.
Notice of Allowance for U.S. Appl. No. 15/670,473, mailed Sep. 18, 2019.
Notice of Allowance for U.S. Appl. No. 15/789,049, mailed Nov. 15, 2018.
Notice of Allowance for U.S. Appl. No. 16/003,557 mailed Feb. 13, 2020.
Notice of Allowance for U.S. Appl. No. 16/569,936, mailed Oct. 14, 2021.
Notice of Allowance for U.S. Appl. No. 18/490,664, dated Aug. 15, 2024.
Notice of Allowance for U.S. Appl. No. 13/937,344, mailed on Jun. 6, 2016.
Notice of Allowance for U.S. Appl. No. 13/937,344, mailed on May 4, 2016.
Notice of Allowance for U.S. Appl. No. 13/937,344, mailed on Oct. 11, 2016.
Notice of Allowance for U.S. Appl. No. 13/937,483, mailed on Jan. 20, 2017.
Notice of Allowance for U.S. Appl. No. 13/937,483, mailed on May 3, 2017.
Notice of Allowance for U.S. Appl. No. 13/937,486, mailed on Jun. 16, 2017.
Notice of Allowance for U.S. Appl. No. 13/937,545, mailed on Jun. 15, 2017.
Notice of Allowance for U.S. Appl. No. 13/937,868, mailed on Feb. 8, 2018.
Notice of Decision to Grant for European Patent Application No. 14736122.4, mailed Aug. 17, 2018.
Notice of Decision to Grant for European Patent Application No. 14745014.2, mailed Feb. 22, 2018.
Notice of Decision to Grant for European Patent Application No. 14745015.9, mailed Feb. 6, 2020.
Notice of Decision to Grant for European Patent Application No. 14745028.2, mailed Feb. 13, 2020.
Notice of Decision to Grant for European Patent Application No. 18187354.8, mailed Sep. 26, 2019.
Office Action and English Translation for Chinese Patent Application No. 201480035250.7, mailed Jul. 5, 2018.
Office Action and English Translation for Chinese Patent Application No. 2014800352507.9, mailed Apr. 6, 2017.
Office Action and English Translation for Chinese Patent Application No. 201480035255.X, mailed Feb. 27, 2017.

Office Action and English Translation for Chinese Patent Application No. 201480035259.8, mailed Dec. 3, 2018.
Office Action and English Translation for Chinese Patent Application No. 201480035259.8, mailed Jun. 14, 2018.
Office Action and English Translation for Chinese Patent Application No. 201480035259.8, mailed Nov. 14, 2017.
Office Action and English Translation for Chinese Patent Application No. 201480035349.7, mailed Apr. 10, 2019.
Office Action and English Translation for Chinese Patent Application No. 201480035349.7, mailed Aug. 3, 2018.
Office Action and English Translation for Chinese Patent Application No. 201480035349.7, mailed Sep. 4, 2019.
Office Action and English Translation for Chinese Patent Application No. 201480039070.6, mailed Aug. 6, 2018.
Office Action and English Translation for Chinese Patent Application No. 201480039070.6, mailed Jan. 10, 2020.
Office Action and English Translation for Chinese Patent Application No. 201480039070.6, mailed Jan. 14, 2019.
Office Action and English Translation for Chinese Patent Application No. 201480039070.6, mailed Jul. 1, 2020.
Office Action and English Translation for Chinese Patent Application No. 201480039070.6, mailed Jul. 24, 2019.
Office Action and English Translation for Chinese Patent Application No. 201480039070.6, mailed Mar. 26, 2019.
Office Action and English Translation for Chinese Patent Application No. 201480039073.X, mailed Dec. 10, 2018.
Office Action and English Translation for Chinese Patent Application No. 201480039073.X, mailed Jul. 17, 2018.
Office Action and English Translation for Chinese Patent Application No. 201480039080.X, mailed Jul. 5, 2018.
Office Action and English Translation for Chinese Patent Application No. 201480039083.3, mailed Dec. 10, 2018.
Office Action and English Translation for Chinese Patent Application No. 201480039083.3, mailed Jul. 10, 2018.
Office Action and English Translation for Chinese Patent Application No. 201711101256.1, mailed Apr. 30, 2021.
Office Action and English Translation for Chinese Patent Application No. 201711101256.1, mailed Dec. 28, 2020.
Office Action and English Translation for Chinese Patent Application No. 201711101256.1, mailed Jun. 3, 2020.
Office Action and English Translation for Chinese Patent Application No. 201711101256.1, mailed Sep. 3, 2021.
Office Action for European Patent Application No. 14745015.9, mailed May 14, 2018.
Office Action for European Patent Application No. 14733037.7, mailed Feb. 12, 2021.
Office Action for European Patent Application No. 14744404.6 mailed Oct. 15, 2018.
Office Action for European Patent Application No. 14745012.6, mailed Jul. 5, 2021.
Office Action for European Patent Application No. 14745012.6, mailed Mar. 5, 2019.
Office Action for European Patent Application No. 14745014.2, mailed Apr. 5, 2017.
Office Action for European Patent Application No. 14745014.2, mailed Jan. 18, 2017.
Office Action for European Patent Application No. 14745028.2, mailed Feb. 13, 2019.
Office Action for European Patent Application No. 14745029.0, mailed Sep. 18, 2018.
Office Action for European Patent Application No. 17726064.3, mailed Apr. 2, 2020.
Office Action for Japanese Patent Application No. 2018-563858, mailed Jan. 19, 2021.
Office Action for Japanese Patent Application No. 2018-563858, mailed Jun. 8, 2021.
Pernul et al., "The Entity-Relationship Model for Multilevel Security", International Conference on Conceptual Modeling, Springer, 1993.
Qiu-Yan et al., "Common Vulnerability Rating Method", Computer Engineering, vol. 34, No. 19, Oct. 2008.

(56) References Cited

OTHER PUBLICATIONS

Sharma et al., Predicting the Priority of a Reported Bug Using Machine Learning Techniques and Cross Project Validation, IEEE, 12th International Conference on Intelligent Systems Design and Applications, Nov. 27-29, 2012.

Siegel et al., "Building Flexible, Extensible Tools for Metadatabase Integration", 1991.

Summons to Attend Oral Proceedings for European Patent Application No. 14744404.6 mailed Sep. 15, 2020.

Summons to Attend Oral Proceedings for European Patent Application No. 14745015.9, mailed Jan. 25, 2019.

Summons to Attend Oral Proceedings for European Patent Application No. 14745029.0, mailed Apr. 25, 2019.

Summons to Attend Oral Proceedings for European Patent Application No. 17726064.3, mailed Jan. 27, 2021.

Supplemental Notice of Allowability for U.S. Appl. No. 13/937,885, mailed Jun. 28, 2021.

Supplemental Notice of Allowance for U.S. Appl. No. 13/937,970, mailed Jan. 19, 2018.

To et al., "Best Practices for Database Consolidation on Exadata Database Machine", Oracle White Paper, Oct. 2013.

Ueda, "Forefront of Technology Utilization, PaaS Oracle Cloud Platform Uses DB/AP Server as Weapons", Nikkei Systems, vol. 270, Oct. 2015.

Vengurlekar, "Best Practices for Database Consolidation in Private Clouds", Oracle White Paper, Mar. 2012.

Wilton, "A Look at Real Application Testing from a Customer's Perspective", available online at http://www.oracle.com/technetwork/oem/gridcontrol/overview/ratcust-perspectives-white-paper-o-132919.pdf, Jan. 1, 2007.

Written Opinion for International Patent Application No. PCT/US2014/040486, mailed Jun. 17, 2015.

Written Opinion for International Patent Application No. PCT/US2014/040692, mailed Jul. 16, 2015.

Yu et al., "Intelligent Database Placement in Cloud Environment", IEEE 19th International Conference on Web Services, IEEE Computer Society, Jun. 24, 2012.

* cited by examiner

INTEGRATED TRANSITION CONTROL CENTER

CROSS-REFERENCE TO RELATED APPLICATIONS

This application is a continuation of U.S. patent application Ser. No. 18/490,664 filed Oct. 19, 2023, entitled "INTEGRATED TRANSITION CONTROL CENTER", which is a continuation of Ser. No. 17/580,196 filed Jan. 20, 2022, entitled "INTEGRATED TRANSITION CONTROL CENTER", now U.S. Pat. No. 11,822,526, issued on Nov. 21, 2023, which is a continuation of U.S. patent application Ser. No. 16/569,936 filed Sep. 13, 2019, entitled "INTEGRATED TRANSITION CONTROL CENTER," now U.S. Pat. No. 11,256,671, issued on Feb. 22, 2022. Each of these applications is hereby incorporated by reference in its entirety for all purposes.

TECHNICAL FIELD OF THE INVENTION

This disclosure generally relates to systems and methods of data migration, and more particularly to systems and methods for adaptive parallel migration of databases.

BACKGROUND

Data migration may generally include transferring any type of data from one storage device, format, or system to another storage device, format, or system. Data migration is often required when organizations or individuals upgrade computer systems, merge existing systems, replatform operating systems in which the database resides, or transfer data between locations. Generally, data must be extracted from the old system and loaded onto the new system if the existing database operating system is not compatible with a migration that is acceptable to end-user needs. For example, it may be necessary to move data between databases when switching to a new database vendor or upgrading an existing version of a database. This may include physical data migration and may change the underlying data format.

Thus, there is a need for systems and methods that address complexities, increase efficiencies, decrease errors, increase speeds, and otherwise improve migration. These and other needs are addressed by the present disclosure.

BRIEF SUMMARY

Embodiments of the present disclosure relate generally to systems and methods of data migration, and more particularly to systems and methods for adaptive parallel migration of databases.

In some aspects, a method to migrate data from a plurality of source databases to a plurality of target databases is disclosed. The method may include one or a combination of the following. Data may be received by a migration infrastructure, the data relating to a plurality of source databases and a plurality of target databases, where the migration infrastructure may be located remotely from the plurality of source databases and the plurality of target databases, and may be configured to provide a migration service that is cloud-based. The data relating to the plurality of source databases and the plurality of target databases may be analyzed by the migration infrastructure. For each database of the plurality of source databases, a migration assessment of the database may be generated by the migration infrastructure based at least in part on the analyzing the data relating to the plurality of source databases and the plurality of target databases. Based at least in part on the migration assessment, a migration method from a plurality of migration methods that the migration infrastructure is configured to facilitate with the migration service may be selected by the migration infrastructure. A migration plan that specifies a parallel migration of a set of databases of the plurality of source databases to one or more databases of the plurality of target databases may be created by the migration infrastructure. The migration plan may specify a first migration method to migrate a first subset of the set of databases and a second migration method to migrate a second subset of the set of databases, where the first migration method is different from the second migration method. Execution of the parallel migration of at least the set of databases according to the migration plan may be caused by the migration infrastructure so that the first subset of the set of databases is at least partially migrated with the first migration method while the second subset of the set of databases is at least partially migrated with the second migration method.

In other aspects, a system to migrate data from a plurality of source databases to a plurality of target databases is disclosed. The system may include one or a combination of the following. A migration infrastructure may include one or more processing devices and memory communicatively coupled with and readable by the one or more processing devices, the memory comprising processor-readable instructions which, when executed by the one or more processing devices, cause the one or more processing devices to perform actions including one or a combination of the following. Data may be received, the data relating to a plurality of source databases and a plurality of target databases, where the migration infrastructure may be located remotely from the plurality of source databases and the plurality of target databases, and may be configured to provide a migration service that is cloud-based. The data relating to the plurality of source databases and the plurality of target databases may be analyzed. For each database of the plurality of source databases, a migration assessment of the database may be generated based at least in part on the analyzing the data relating to the plurality of source databases and the plurality of target databases. Based at least in part on the migration assessment, a migration method from a plurality of migration methods that the migration infrastructure is configured to facilitate with the migration service may be selected. A migration plan that specifies a parallel migration of a set of databases of the plurality of source databases to one or more databases of the plurality of target databases may be created. The migration plan may specify a first migration method to migrate a first subset of the set of databases and a second migration method to migrate a second subset of the set of databases, where the first migration method is different from the second migration method. Execution of the parallel migration of at least the set of databases according to the migration plan may be caused so that the first subset of the set of databases is at least partially migrated with the first migration method while the second subset of the set of databases is at least partially migrated with the second migration method.

In still other aspects, one or more non-transitory, machine-readable media having machine-readable instructions thereon are disclosed. The machine-readable instructions, when executed by one or more processing devices, may cause the one or more processing devices to perform actions including one or a combination of the following. Data may be received, the data relating to a plurality of source databases and a plurality of target databases, where the one or more processing devices may be located remotely from the plurality of source databases and the plurality of target databases, and may be configured to provide a migration service that is cloud-based. The data relating to the plurality of source databases and the plurality of target databases may be analyzed. For each database of the plurality of source databases, a migration assessment of the database may be generated based at least in part on the analyzing the data relating to the plurality of source databases and the plurality of target databases. Based at least in part on the migration assessment, a migration method from a plurality of migration methods that the one or more processing devices are configured to facilitate with the migration service may be selected. A migration plan that specifies a parallel migration of a set of databases of the plurality of source databases to one or more databases of the plurality of target databases may be created. The migration plan may specify a first migration method to migrate a first subset of the set of databases and a second migration method to migrate a second subset of the set of databases, where the first migration method is different from the second migration method. Execution of the parallel migration of at least the set of databases according to the migration plan may be caused so that the first subset of the set of databases is at least partially migrated with the first migration method while the second subset of the set of databases is at least partially migrated with the second migration method.

In various embodiments of the above, for each database of the plurality of source databases, a plurality of migration scripts may be generated to transfer a plurality of objects from the database to at least one database of the plurality of the target databases using the selected migration method. In various embodiments of the above, one or more specifications of one or more migration constraints that apply to one or more databases of the plurality of source databases may be identified by the migration infrastructure. For at least one database of the plurality of sources databases, the migration method may be selected from the plurality of migration methods based at least in part on the one or more specifications of the one or more migration constraints.

In various embodiments of the above, for each database of the plurality of source databases, a predicted time to migrate the database to the at least one database of the plurality of the target databases using the selected migration method may be generated. For the at least one database of the plurality of sources databases, the migration method may be selected from the plurality of migration methods based at least in part on a determination that the predicted time to migrate the at least one database satisfies the one or more specifications of the one or more migration constraints. In various embodiments of the above, based at least in part on the analyzing, a database composite for each database of the plurality of source databases may be created based at least in part on the analyzing, each database composite including a set of one or more metrics for the database corresponding to the database composite. In various embodiments of the above, the generating the migration assessment of the database may be based at least in part on the database composite for each database of the plurality of source databases. In various embodiments of the above, only one of the first migration method and the second migration method may include reorganizing data when the data is transferred.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of embodiments according to the present disclosure may be realized by reference to the remaining portions of the specification in conjunction with the following appended figures.

Figure 1:
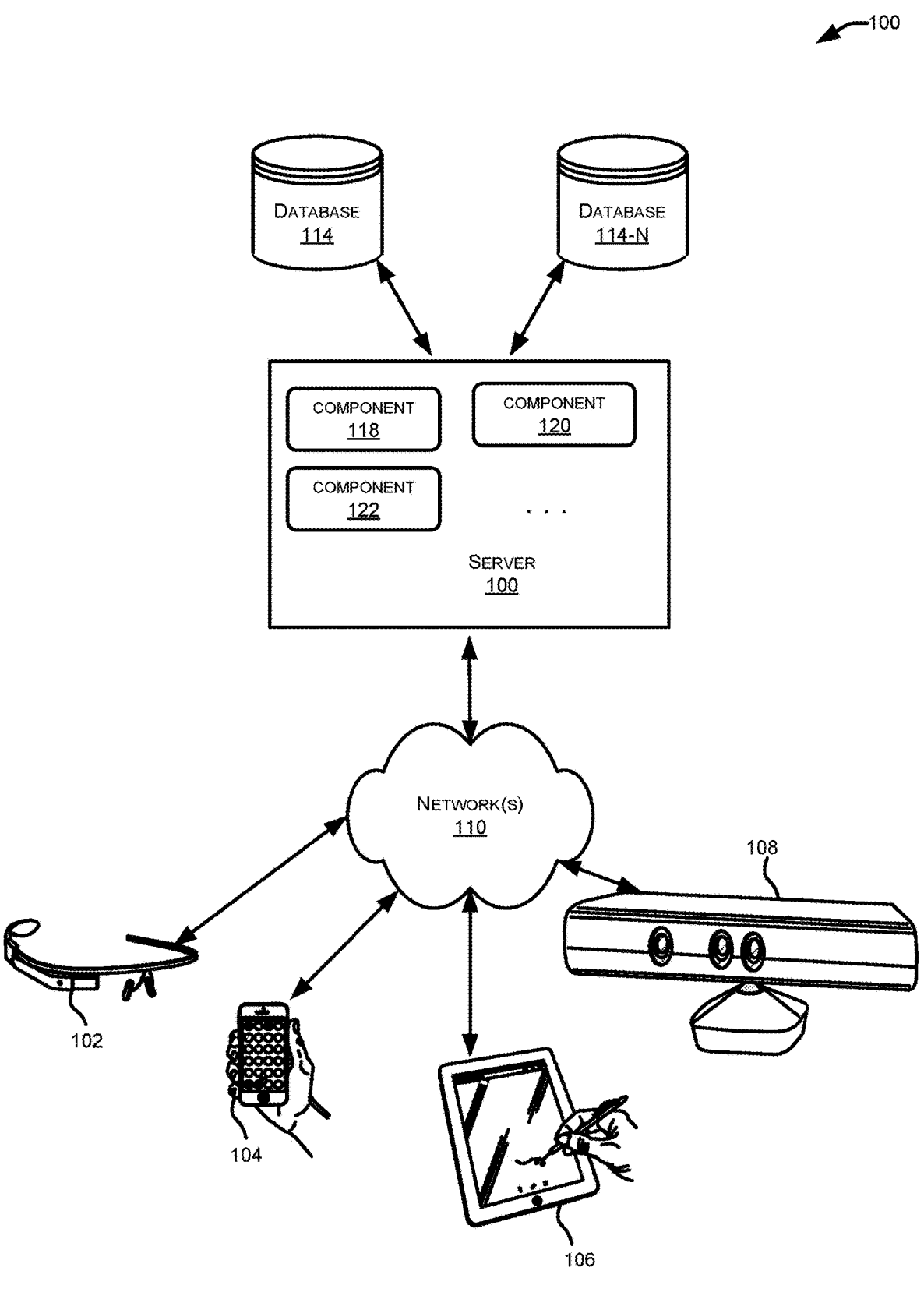
FIG. 1 illustrates depicts a simplified diagram of a distributed system accordance with disclosed embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

The individual migration of a system may be very time and resource intensive. Among the various challenges that are presented with migration may be determining the most appropriate migration method for a particular system to, among other things, minimize risk, time, and efforts. At least partially because the migration methods can differ significantly in the needed skills, not always is the best method chosen. Instead, oftentimes the chosen method is simply a method with which an involved person is most familiar. This can result in higher costs, higher risks, errors, and non-optimal migration scenarios.

Disclosed embodiments may address such challenges and others. Disclosed embodiments may provide for systems and methods that address complexities, increase efficiencies, decrease errors, increase speeds, and otherwise improve migration. For example, disclosed embodiments may migrate systems in as highly automated a manner as possible and may allow for parallel migration of multiple and many database systems simultaneously. In such parallel migrations, the migrations of the individual databases may be performed simultaneously and/or at least partially simultaneously such that portions of the migration processes of the multiple databases overlap and are performed simultaneously. Thus, for example, multiple database migrations may be initiated at the same time or substantially at the same time, but the migrations may be completed at different times depending on the variations and differences of the migration particulars. This large-scale parallel migration of databases may be in addition to, and distinguishable from, parallel execution of migration processes (e.g., migration scripts) with respect to a single databases. Moreover, disclosed embodiments may take into account that system migration, including database migration, is a very complex project, especially if there is a very high number of systems to migrate.

Among other things, disclosed embodiments may provide for a centralized structure that supports various migration methods for migration to various targets such as cloud on premise, public cloud, autonomous database, and/or the like. Further, disclosed embodiments may allow for dynamically switching between two or more different migration methods to migrate components (e.g., to migrate databases, applications, etc.) of a first system (i.e., a source/legacy system) to a second system (i.e., a target system). Many automated services for performing migrations may be bundled into a single approach. Further, disclosed embodiments may provide for the dynamic identification of the most appropriate service as a function of migration characteristics of a particular migration scenario. The system may be configured to select a set of one or more best methods for a particular migration.

Various embodiments will now be disclosed in greater detail with reference to the accompanying figures, beginning with FIG. 1. FIG. 1 depicts a simplified diagram of a distributed system 100 for implementing disclosed embodiments in accordance with present disclosure. The selection and/or arrangement of components depicted in FIG. 1 are shown only by way of example, and are not meant to be limiting. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114. Databases 114 may reside in a variety of locations. By way of example, one or more of databases 114 may reside on a non-transitory storage medium local to (and/or resident in) server 112. Alternatively, databases 114 may be remote from server 112 and in communication with server 112 via a network-based or dedicated connection. In one set of embodiments, databases 114 may reside in a storage-area network (SAN). Similarly, any necessary files for performing the functions attributed to server 112 may be stored locally on server 112 and/or remotely, as appropriate. In one set of embodiments, databases 114 may include relational databases, such as databases provided by Oracle, that are adapted to store, update, and retrieve data in response to SQL-formatted commands.

Figure 2:
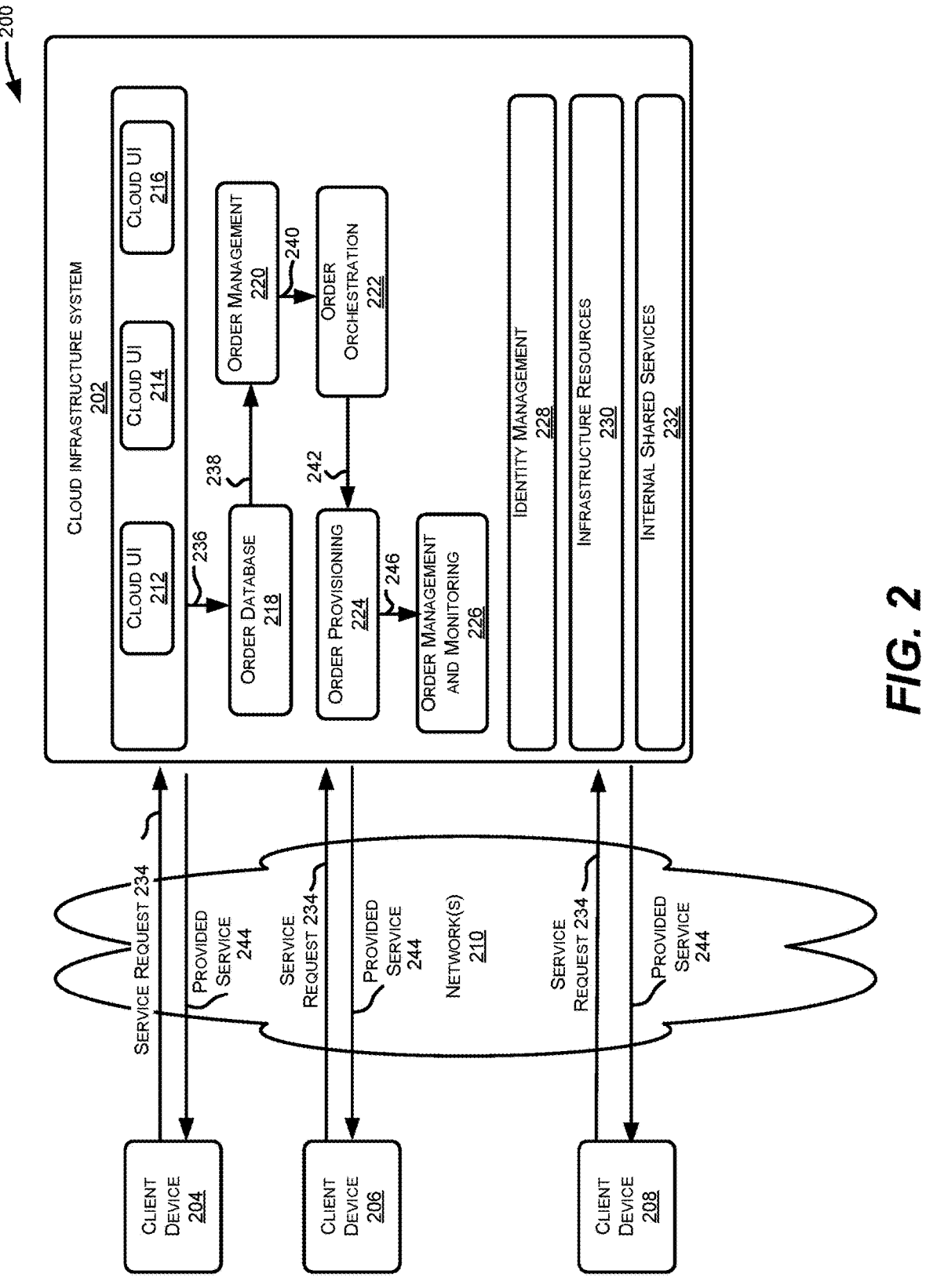
FIG. 2 illustrates simplified block diagram of one or more components of a system environment by which services provided by one or more components of a system may be offered as cloud services, in accordance with disclosed embodiments of the present disclosure.

FIG. 2 is a simplified block diagram of one or more components of a system environment 200 by which services provided by one or more components of a system may be offered as cloud services, in accordance with certain embodiments of the present disclosure. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108. Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110. Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the client's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a client in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a client's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A client, via a subscription order, may order one or more services provided by cloud infrastructure system 202. Cloud infrastructure system 202 then performs processing to provide the services in the client's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, clients can utilize applications executing on the cloud infrastructure system. Clients can acquire the application services without the need for clients to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Clients can acquire the PaaS services provided by the cloud infrastructure system without the need for clients to purchase separate licenses and support. Examples of platform services include, without limitation, Oracle Java Cloud Service (JCS), Oracle Database Cloud Service (DBCS), and others.

By utilizing the services provided by the PaaS platform, clients can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer clients a Database as a Service in the form of a database cloud. Middleware cloud services may provide a platform for clients to develop and deploy various business applications, and Java cloud services may provide a platform for clients to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for clients utilizing services provided by the SaaS platform and the PaaS platform.

In certain embodiments, cloud infrastructure system 202 may also include infrastructure resources 230 for providing the resources used to provide various services to clients of the cloud infrastructure system. In one embodiment, infrastructure resources 230 may include pre-integrated and optimized combinations of hardware, such as servers, storage, and networking resources to execute the services provided by the PaaS platform and the SaaS platform. In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a client's subscription received by cloud infrastructure system 202, and the like.

In certain embodiments, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a client using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the client may access a cloud User Interface (UI), cloud UI 212, cloud UI 214 and/or cloud UI 216 and place a subscription order via these UIs. The order information received by cloud infrastructure system 202 in response to the client placing an order may include information identifying the client and one or more services offered by the cloud infrastructure system 202 that the client intends to subscribe to.

After an order has been placed by the client, the order information is received via the cloud UIs, 212, 214 and/or 216. At operation 236, the order is stored in order database 218. Order database 218 can be one of several databases operated by cloud infrastructure system 218 and operated in conjunction with other system elements. At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the client. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the client. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to clients on client devices 204, 206, and/or 208 by order provisioning module 224 of cloud infrastructure system 202. At operation 246, the client's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about clients who wish to utilize the services provided by cloud infrastructure system 202. Such information can include information that authenticates the identities of such clients and information that describes which actions those clients are authorized to perform relative to various system resources (e.g., files, directories, applications, communication ports, memory segments, etc.). Identity management module 228 may also include the management of descriptive information about each client and about how and by whom that descriptive information can be accessed and modified.

Figure 3:
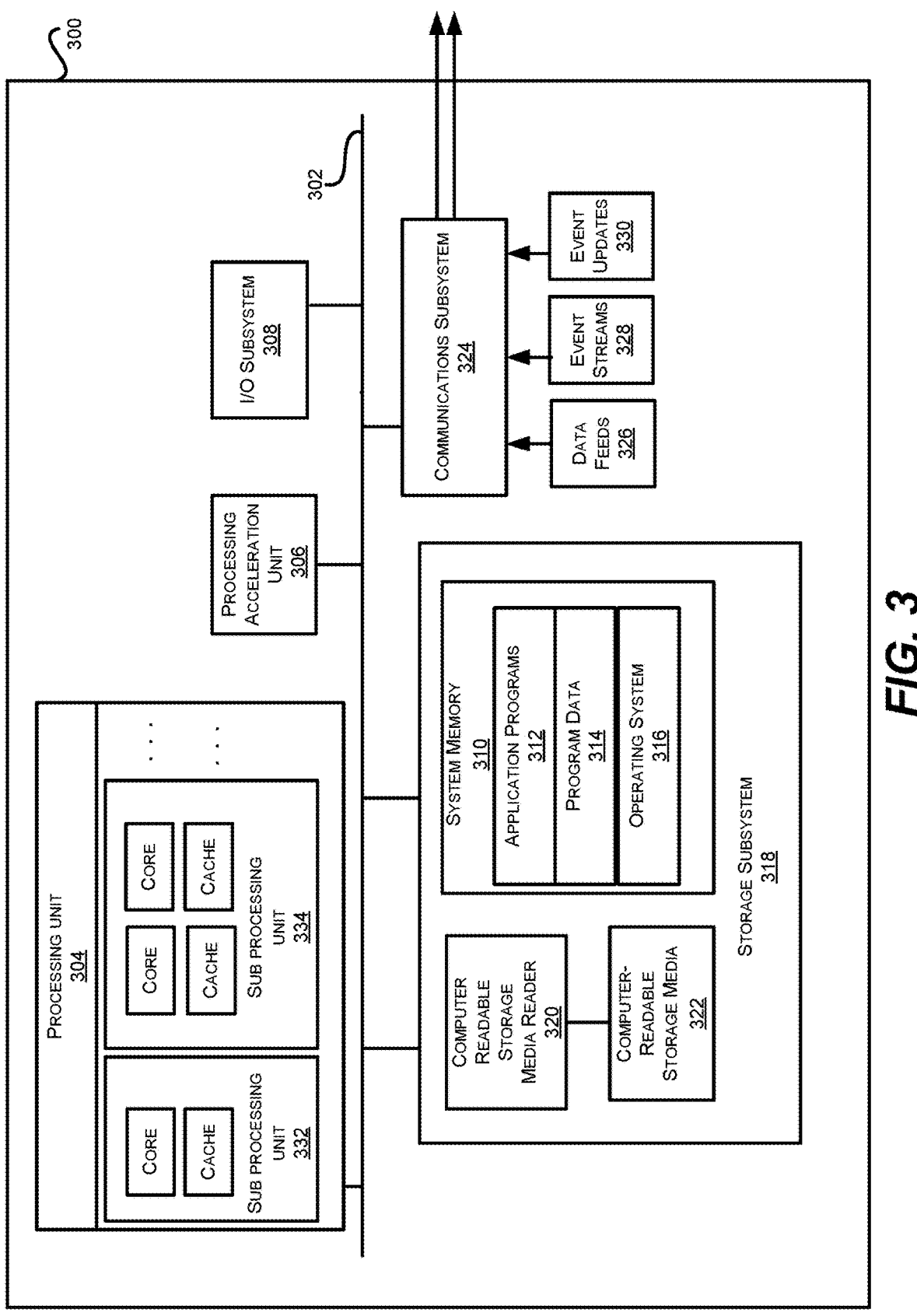
FIG. 3 illustrates an exemplary computer system, in accordance with disclosed embodiments of the present disclosure.

FIG. 3 illustrates an exemplary computer system 300, in which various embodiments of the present invention may be implemented. The system 300 may be used to implement any of the computer systems described herein. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like. In some embodiments, the processing acceleration unit 306 may include or work in conjunction with an acceleration engine such as that disclosed herein to improve computer system functioning.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a database, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs. Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during startup, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300. By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Various methods described herein may be implemented by a computer system, such as computer system 300. Each step of these methods may be executed automatically by the computer system 300. In various embodiments, some steps may be provided with inputs/outputs involving a user. For example, a user may provide inputs for each step in a method, and each of these inputs may be in response to a specific output requesting such an input, wherein the output is generated by the computer system 300. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. Furthermore, some embodiments of each of the methods described herein may be implemented as a set of instructions stored on a tangible, non-transitory storage medium to form a tangible software product.

As with nearly all software-based systems, database systems are often required to undergo periodic upgrades in order to take advantage of new computing technologies. During a migration process, one or more older database systems may be migrated over to new database systems. Migration may be needed because software or hardware becomes obsolete, or because the advantages offered by newer database systems may provide efficiencies savings or other advantages. With embodiments of this disclosure, migration may allow for upgrading existing hardware and/or change the operating system of legacy database server machines, while keeping the database. By way of example, an existing database may be transitioned from legacy hardware to a new database machine (e.g., Exadata Database Machine).

A source database may refer to a database installation and may correspond to a grouping of one or more computer systems that stores and includes the database installation. The source database may fulfill retrieval, update, and other forms of database queries. A migration may refer to moving or copying objects in one or more source databases to one or more target databases. Therefore, prior to migration, the database installation may only be available on the source database(s). Following the migration, the database installation may be present on the target database(s) and, possibly, still present on the source databases. The target databases may refer to a grouping of one or more computer systems that stores the database installation after the migration. The target databases may then include the database installation and fulfill retrieval, update, and other forms of database queries following the migration.

Figure 4:
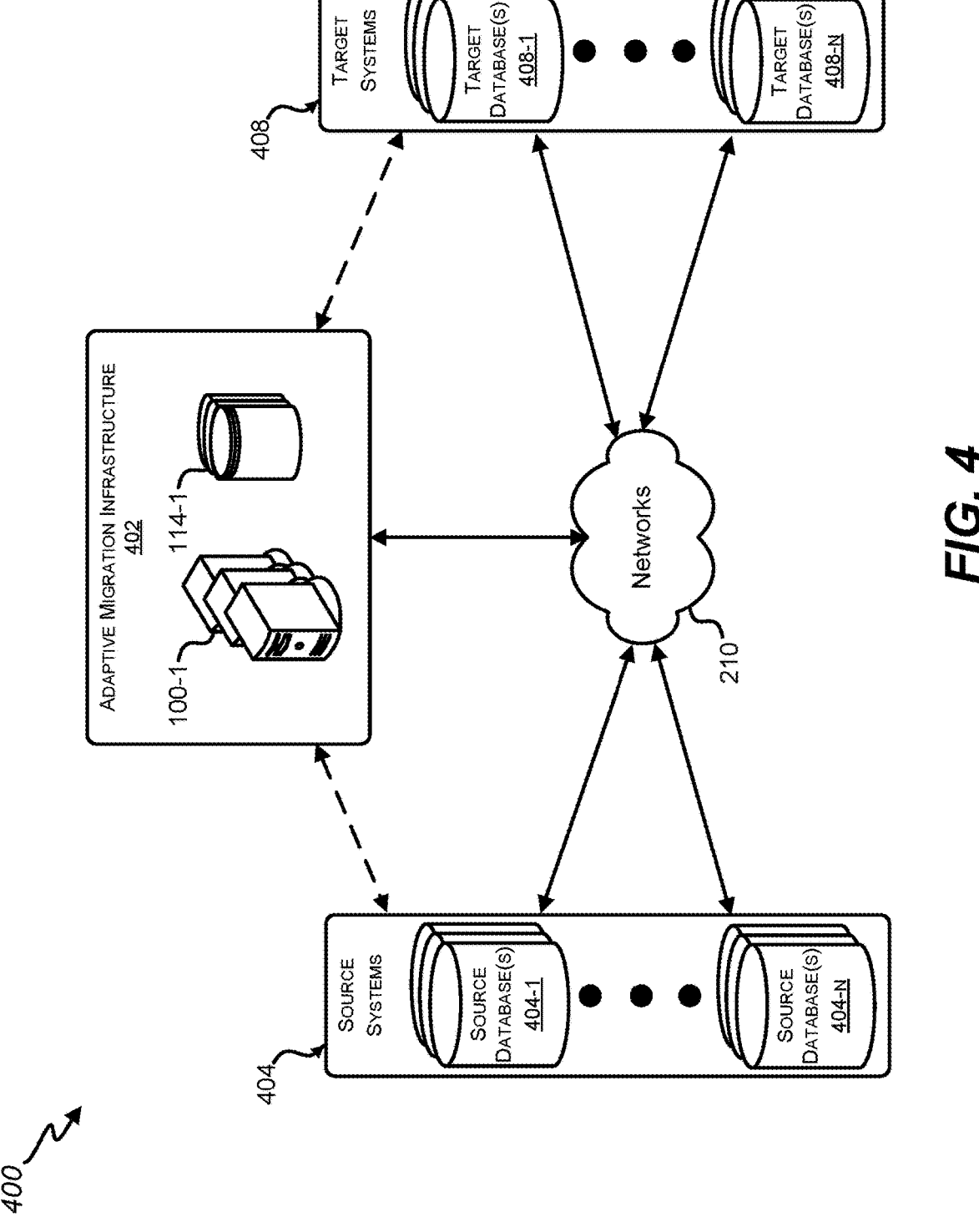
FIG. 4 illustrates a high-level block diagram of certain aspects of a migration environment, in accordance with disclosed embodiments of the present disclosure.

FIG. 4 depicts a high-level block diagram of certain aspects of a migration environment 400, in accordance with embodiments of the present disclosure. The migration environment 400 may at least partially correspond to the distributed system 100 and the system environment 200. The migration environment 400 may include an adaptive migration infrastructure 402. The adaptive migration infrastructure 402 (which may be referenced herein as "adaptive migration system" or "migration system") may include one or more servers 112 and/or one or more computer systems 300 and may correspond to the cloud infrastructure system 202 in some embodiments.

A client IT infrastructure may house one or more source systems 404 (e.g., database systems) as well as one or more target systems 408 (e.g., database systems). For relatively large enterprises, the client IT infrastructure may be geographically distributed across multiple locations. For relatively smaller clients, the client IT infrastructure may be located in a single facility. In some instances, for example, the target systems 408 may reside in the same room as the source systems 404.

In some embodiments, the target systems 408 may be located remotely. In some embodiments, the target systems 408 may be operated by a cloud storage facility. This type of migration may relieve the client from the responsibility of operating and maintaining the target systems 408. In some embodiments, the target systems 408 may be co-located with or co-operated by the same entity providing a cloud migration service. For example, the target systems 408 may be integrated with a remote operations center of a cloud service, e.g., of the cloud infrastructure system 202 in some embodiments.

It will be understood that the adaptive migration infrastructure 402 may be remotely located from the source systems 404 and the target systems 408, and the source systems 404 and the target systems 408 may or may not be remotely located from one another. As used herein, the term "remotely located" will be understood to mean geographically remote or geographically removed. Entities that are remotely located from each other will typically be located in separate facilities many miles away from each other. For example, entities that are remotely located from each other may be separated by distance of at least 5 miles, 10 miles, 15 miles, 100 miles, and/or the like.

The migration infrastructure 402 may include one or more migration control server systems 100-1 and one or more automated transition suite databases 114, and may be configured to provide an automated transition suite designed to facilitate migration of the one or more source systems 404 to the one or more target systems 408 in as highly automated a manner as possible. The migration infrastructure 402 may correspond to a centralized structure that supports various migration methods for migration to various targets for the target systems 408 such as cloud on premise, public cloud, autonomous database(s), and/or the like. Further, the migration infrastructure 402 may allow for dynamically switching between two or more different migration methods to migrate components (e.g., to migrate databases, applications, etc.) of the one or more source systems 404 to the one or more target systems 408. The migration infrastructure 402 may be configured to provide many automated services for performing migrations bundled into a single approach. Further, the migration infrastructure 402 may be configured to dynamically identify the most appropriate set of one or more services as a function of migration characteristics of the particular migration scenario for the migration of the one or more source systems 404 to the one or more target systems 408. In so doing, the migration infrastructure 402 may be configured to select a set of one or more best methods for the particular migration, the selection being a function of a number of variables/factors disclosed herein.

Contrary to conventional migration, with migrations facilitated by the migration infrastructure 402, it is not necessary for an engineer to connect to the source system 408, configure it, install the needed software, getting the activation key, etc. The automated transition suite may run on a centralized host, e.g., a virtual machine in some embodiments. The machine may correspond to the one or more control server systems 100-1. Migration processes may be started and controlled by the control server systems 100-1. The access to the source systems 404 and the target systems 408 may use secure connections (e.g., Secure Shell (SSH) connections or the like) and/or database links within the databases. The data transport may rely on a database-to-database communication and may be completely independent of the underlying operating system and storage platforms. The network interfaces of the migration infrastructure 402 may include one or more API interfaces to transmit to and/or receive communications from the source systems 404 and/or the target systems 408 using APIs. The one or more API interfaces may include one or more APIs that define protocols and routines for interfacing with the source systems 404 and/or the target systems 408 via an API interface. The APIs may specify API calls to/from the source systems 404 and/or the target systems 408. In various embodiments, Secure Shell (SSH) and/or any other suitable protocol may be used to facilitate communications between the migration infrastructure 402 and the source systems 404 and/or the target systems 408. In some embodiments, to gather system data, the migration infrastructure 402 may run one or more scripts, select one or more databases, establish one or more communication pipes to the one or more databases, log into the one or more databases for command line access via a transport layer by, for example, IP address and SSH, and pull system data from the one or more databases.

All manual steps on the source systems 404 and the target systems 408 may be eliminated. This architecture may allow for the inclusion hundreds or more of systems into a migration project and may allow for control of all migrations from a single application. Each server of the control server systems 100-1 may have sufficient hardware resources to run all processes for 4, 10, 20, or more parallel migrations. The automated transition suite may save all scripts and logfiles, created in each migration, on file system and in the automated transmission suite databases 114.

Migration setups may include initially registering the source systems with the migration infrastructure 402, configuring source access (e.g., source OS access) for access by the migration infrastructure 402 at least partially by loading source access definitions from file and generating definitions automatically for all systems, deploying analysis agent(s) on the source systems 404 to perform the database analyses, configuring the database links and database link information needed to access the systems remotely, and analyzing the source systems 404 by running the source system analyses to acquire detailed information about the configured source systems 404 (e.g., system data 612 disclosed further herein). Disclosed embodiments may increase the speed of setup so that it only takes several minutes, as opposed to half a day to copy all files, do export and import, configure user permissions, configure source system access, etc. In some embodiments, CSV files may be used, and, instead of having to log on to the source system 404 to load a SQL package, create directories, file system, etc., the central instance provided by the infrastructure 402 may be logged into in order to load the information from a file and run all remotely. Access to the source system 404 may be provided through a database link to skip manual configuring of the source systems 404. Such processes, the deploying of analysis agents and the performance of analyses, for example, may run in the background. This may allow for the seamless testing of a large number of systems, without blocking, disrupting, or otherwise hampering other activities.

The migration infrastructure 402 may automatically install an agent on the source databases 404 to run the analysis after any necessary privileges (e.g., selecting any dictionary, restricted session, connection, select catalog role, execute on database system admin, and/or the like privileges) have been granted to the agent. Configuring the database to connect to the source systems 404 may include loading a migration package and running the migration package on by the migration infrastructure 402. Analyses may then be executed remotely through the database links. The ATS suite may create the database links automatically. TNS configuration may not be needed to do so, and the database links may use connection strings (e.g., hostname:port/SID) to connect to the source systems 404 and the target systems 408. The client may configure firewalls so that an inbound connection, using TNS-specific ports, are allowed to the source systems. Listener configurations may be updated on the source systems 404 and/or the target systems 408, if connections only from specific hosts are configured. Database link configuration may be loaded using an input file to load the database link definitions with syntax of host name and database name corresponding to the host name and database name combinations of the source systems 404 configuration and/or the target systems 408 configuration to facilitate the mapping to the source systems 404 and/or the target systems 408. The analyses of the source systems 404 and/or the target systems 408 may proceed with the passing of the validation for the database link configuration.

One of the elements of the cloud support service may be a gateway that communicates with the migration infrastructure 402 through a secure connection using a communication module over the network(s) 210. In order to interface with the migration infrastructure 402 and the services available thereby, the IT infrastructure may include a gateway provided by the migration infrastructure 402 and operating locally with respect to the source systems 404. An Enterprise Manager may be implemented as a specialized module within the gateway. The gateway may include a module that has access to the source systems 404 and can provide statistics and information regarding the source systems 404 to the adaptive migration infrastructure 402. The gateway may include a hardware and/or virtual software appliance installed at the client data center.

The gateway may collect information from the source systems 404, including information on data objects to be migrated to the target systems 408, source/target information, and operating system configurations, and may transmit such information to both the target systems 408 and/or the adaptive migration infrastructure 402. The support gateway may collect performance information and configuration data related to the source systems 404 and/or the target systems 408, and the adaptive migration infrastructure 402 may then use that performance information to perform a migration analysis, generate migration scripts, generate a migration plan that are customized for the client IT infrastructure, and then execute the migration plan to migrate the source systems 404 to the target systems 408.

In some embodiments, the migration and data analyses may be carried out by the gateway installed as an integrated part of the client system. The gateway may communicate with the migration infrastructure 402 and the portal disclosed herein in order to govern and report on the migration process. Disclosed embodiments may utilize the enterprise manager to consistently and/or periodically monitor and model the database systems 404 and/or 408. An Enterprise Manager agent may be employed to collect and monitor modeling data associated with the customer's databases. Additionally, customer configurations such as EM plugins or custom collectors that interrogate and analyze source and/or target systems may be used. This information may be uploaded to a service of the migration infrastructure 402 through the gateway that resides on the client system. The service of the migration infrastructure 402 may then perform calculations and analysis on the data recorded by the agent in order to provide data for specific migration scenarios.

The migration infrastructure 402 may determine if a gateway is available to give access to/from one or more client sites in order to allow service delivery. If a gateway is available, the migration infrastructure 402 may examine the gateway configuration to ensure that the gateway is properly configured, including the agents, with the migration infrastructure 402 configuring of the gateway and the agents as necessary. If a gateway is not available, the gateway may be downloaded for installation. It may be installed at a client site and configured along with the agents and plug-ins using auto-discovery to set up workflow for the service. Agents may be deployed on all relevant hosts identified via pre-flight phase. The agents may, in various embodiments, correspond to a bot, a listener, a plug-in, and/or the like software components/modules configured to perform the features disclosed herein with respect to the source systems 404, the target systems 408, and/or the migration infrastructure 402.

Figure 5:
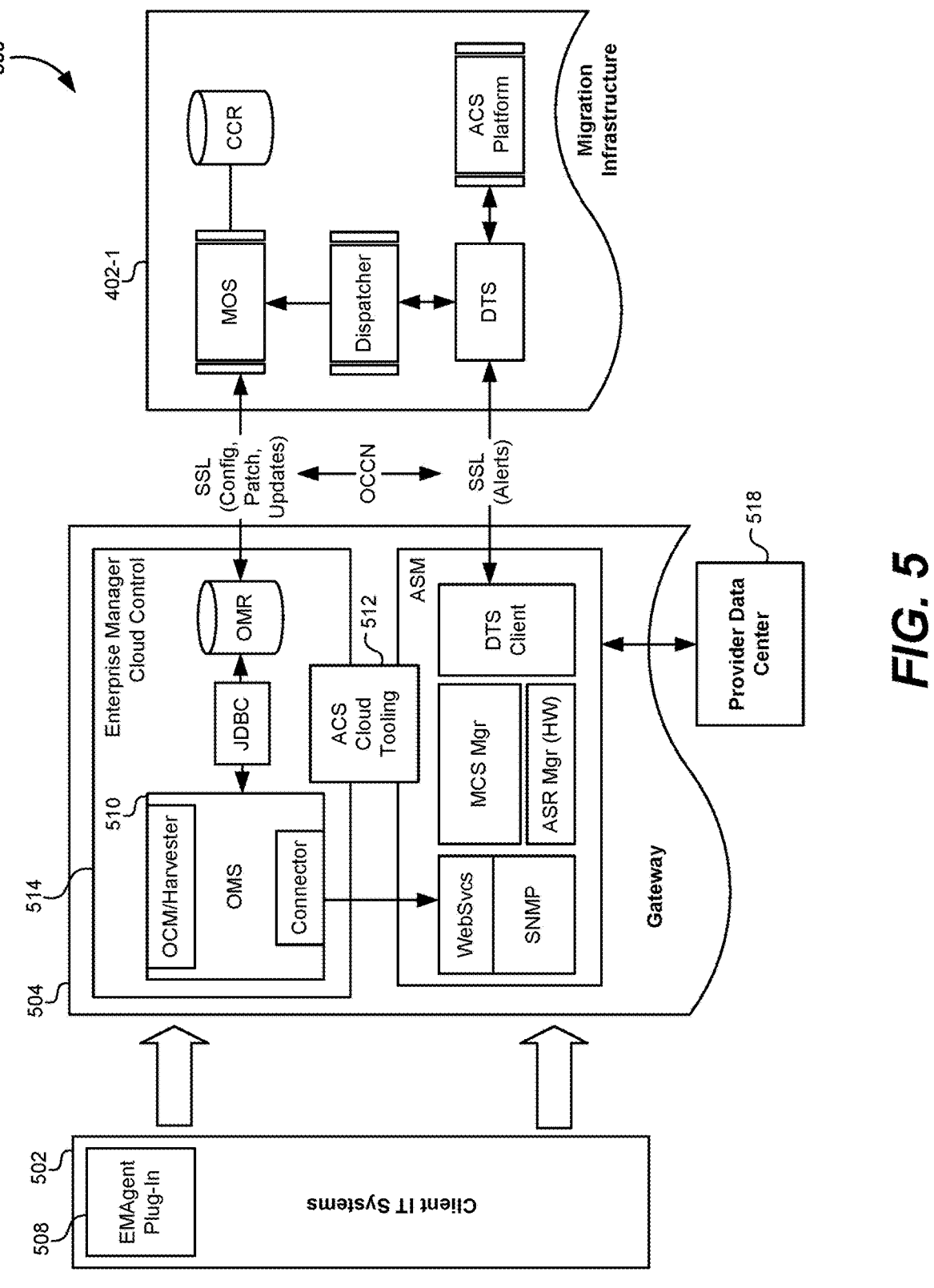
FIG. 5 illustrates a block diagram of a gateway in accordance with certain embodiments of the present disclosure.

FIG. 5 illustrates a block diagram of a gateway 504, in accordance with embodiments of the present disclosure. By being installed with the client system, a gateway 504 may be able to access the client IT systems 502 using one or more agent plug-ins 508. For example, the gateway 504 may collect, format, and store information that is normally collected by an enterprise manager 514.

The gateway 504 may use the client's existing database estate as an input. For example, a client IT system 502 may be used and may include multiple environments such as development, test, and production environments, databases, and/or the like. In many cases, databases in the client IT system 502 may be implemented with legacy hardware that is no longer considered state-of-the-art or in a system that is no longer supported as a platform or as a currently-supported software version, thus prompting the database migration to more advanced database systems.

In some embodiments, the gateway 504 may be designed to be proactive, in that it is performed in the background during normal operations. The results of migration analysis performed proactively may be used to plan the actual database migration plan. For example, the gateway 504 may analyze source databases and/or target databases systems prior to a client request. One key benefit of this preemptive service is the ability to model and size database migration scenarios that group together similar systems based on behaviors, configurations, and/or outputs. The grouping of similar systems may be done in accordance with a set of best practices as identified by the client. A grouping may also be based on the recovery time objective as specified by the client. By performing this analysis in advance of the actual database migration process, this assessment phase may greatly reduce the rising costs to resolve migration problems or outages.

In order to collect performance data, one or more of the agents 508 may be deployed on the client IT system 502. For example, an Enterprise Manager Agent may be installed as a collector that gathers information in response to detected events, such as a database going offline. Peak events that consume resources that may impact a migration. Specific configuration data on a source/target database or operating system may also impact a migration. These agents may be configured to provide performance data to the Enterprise Manager 514. The collected data may be selected so as to provide relevant database metrics for the migration analysis process. For example, an agent 508 may be focused on capturing a production workload for a selection of databases such that they can be mapped to a destination environment on a newer, more efficient platform.

The agent 508 may send performance data collected from the client IT system 502 to the gateway 504. In some embodiments, the collected data may be sent to the enterprise manager cloud control 514 that resides within the gateway. The gateway 504 may be configured to operate on a client system as a control point for managing how internal users and/or application assets are exposed to outside systems. The gateway 504 may provide access security, data security, auditing and monitoring capabilities, and/or integration with external systems. In one embodiment, the gateway 504 may provide access to a provider data center 518 and the migration infrastructure 402-1 that are remotely located away from the client IT system 502. The migration infrastructure 402-1 may be operated by a provider of databases and software used by the client IT system 502.

The gateway 504 may include a type of enterprise manager 514 that is configured to operate in conjunction with the migration infrastructure 402-1. A cloud tooling module 512 may operate with the enterprise manager 514 to extract and/or modify data that is already being collected by the enterprise manager 514 during or type of operations. The data collected and/or modified by the cloud tooling module 512 may be selected as being relevant to analyzing database operations. These data may then be provided to the migration infrastructure 402-1 for processing. In some embodiments, the gateway 504 may operate in a manner that is transparent to the client. Data for use in database migration may be collected in the background during normal operations and stored at the provider data center 518.

As disclosed herein, the remote adaptive migration infrastructure 402 may include a plurality of various network interfaces to communicate with the source/target systems 404, 408 and endpoint devices 102-108, 204-208, and/or the like. The network interfaces may include one or more database sys interfaces, endpoint device interfaces, and/or the like to transmit to and/or receive communications from one or a combination of the source/target systems 404, 408, endpoint devices 102-108, 204-208, and/or the like. In various embodiments, one or more of the interfaces may include or otherwise correspond to API interfaces to transmit to and/or receive communications from one or a combination of the source/target systems 404, 408, endpoint devices 102-108, 204-208, and/or the like using APIs.

Disclosed embodiments may further provide for not only migration of a large number of systems in parallel, but also orchestrating, organizing, and monitoring the parallel migrations. The remote adaptive migration infrastructure 402 may provide a portal, which may correspond to a cloud portal, support cloud portal, and/or the like, and which may include and/or otherwise facilitate a migration orchestration interface. The adaptive migration infrastructure 402 may provide one or more applications disclosed herein to facilitate the migration orchestration interface via the client device interfaces to expose migration monitoring, simulation, and control features to one or more the endpoint devices. In some embodiments, the client device interfaces may include the migration orchestration interfaces. The migration orchestration interface may provide for a remote migration interface that allows for management of migrations remotely, including communication with source systems 404 and target systems 408 to control, monitor, and change migrations while enforcing constraints and limitations particular to the databases and systems on a component-by-component basis to, for example, prohibit changes that would result in taking down or otherwise negatively impacting performance of critical servers, databases, systems, computers, etc. For example, the portal may include migration orchestration interfaces that allow for initiation of parallel migration processes and for constantly monitoring the parallel migration processes in real time. Among other things, the migration orchestration interface may facilitate user interfaces to view and confirm selected and system-recommended migration plans for the source/target databases 404, 408; to view the system-recommended migration plan, one or more system-recommended migration methods, and migration analyses; to surface parameter fields of adjustable parameters that affect the migration plan; to review the final migration plan before migration begins; to expose summary screens about the current configured systems and different statuses of the migrations (e.g., successfully completed migrations, finalized migration plans, etc.); to override, change, run, and otherwise control migration processes; to view an emulation of the parallel database migrations; and/or the like.

In some embodiments, the migration orchestration interfaces may include an API to interact with the migration infrastructure 402. In various embodiments, the migration infrastructure 402 may include, provide, and/or be configured for operation with the migration orchestration interfaces, for example, by making available and/or communicating with one or more of a website, a web page, a web portal, a web application, a mobile application, enterprise software, and/or any suitable application software to facilitate the orchestration interface. In some embodiments, the migration orchestration interface may cause a web page to be displayed on a browser of a user device. The web page(s) may display output and receive input from a user (e.g., by using Web-based forms, via hyperlinks, electronic buttons, etc.). The migration infrastructure 402 may provide web applications to a user device for execution in a web browser running on the user device; and the web applications may include scripts, such as Java, JavaScript, etc., for execution within an isolated environment in a browser. A variety of techniques can be used to create the web pages and/or display/receive information, such as JavaScript, Java applications or applets, dynamic HTML and/or AJAX technologies. In some embodiments, the migration infrastructure 402 may provide rich-client applications to a user device; and the rich-client applications may be programmed in traditional programming languages to have full access to functions of the operating system running on the user device. In some embodiments, the orchestration interface may include or work with a mobile application.

The migration orchestration interface, and the migration infrastructure 402 generally, may be multi-user capable and may provide graphical user interfaces to facilitate interaction with the infrastructure 402 by many users in parallel. The user interface may fully display the current status, running jobs, failed jobs, and other migration indicators, allowing each user to check the current status of a particular migration of the plurality of migrations running in parallel at any time. In some embodiments, the user interface may be provided via a browser window and may correspond to a remote interface that that facilitates remote initiation and monitoring of a migration, without physical presence at a client site being necessary. The user interface may allow for initiation, monitoring, and adjustment of many migrations which may be run in parallel. The technological improvements of disclosed embodiments allow for a significant increase in migration efficiencies and capabilities over and above conventional migrations. With disclosed embodiments, a single user may initiate, monitor, and adjust as necessary large scale numbers of migrations run in parallel.

At the same time, the multi-user capable, migration orchestration interface may protect data from being incidentally changed. For example, orchestration rules may provide for restrictions that allow only one migration configuration to be in play at a time for a particular database migration, where changes to the configuration are restricted once it is loaded into the system. The orchestration interface may facilitate a restricted mode that allows viewing of a system during migration, while prohibiting detrimental changes. The orchestration rules may preempt conflicts of terminal windows, preempt operator errors due to simultaneous migration system access, ensure when access should be running in test mode and not on production, and lock out others when one user attempts to remediate an error. User roles, access to particular source/target systems and corresponding migration details, and/or the like via the orchestration interface may be filtered. For example, only a subset of users may be allowed to work on development systems, on production systems, source server with X number of databases to migrate, etc. In some embodiments, only admin users can log into the system to avoid user changes to data while a system is being migrated.

In some embodiments, an access management layer of the infrastructure 402 may include one or more identity management engines. Generally, the identity management engine can be configured to provide identity services, such as access management and authorization services for users and/or providers serviced by the interaction infrastructure 402. The infrastructure 402 may store information about users and providers to facilitate the identity and access management in the endpoint profile data storage 101C disclosed herein. In some embodiments, the identity management engine may control information about end users and providers that utilize the services provided by the infrastructure 402. The control information may include information that authenticates the identities of end users and/or providers and that specifies authorized actions with respect to various system resources and services pre-migration, during migration, and post-migration.

In some embodiments, the identity management engine may include logic for implementing account features in various embodiments. By way of example without limitation, the identity management engine may include logic one or more aspects of: handling user registration; managing account creation, updates, authentication, handling; and/or the like. The identity management engine may be configured for acquiring, processing, formatting, and/or storing authentication information in the endpoint profile data storage 101C. An authentication access engine may evaluate rules and conditions under which users may access elements of the infrastructure 402. A login engine may evaluate the rules and conditions under which users are able to log in to the interaction system or access applications associated with the interaction system. Thus, while authentication access engine may evaluate the rules to determine which users may access the infrastructure 402, the login engine may evaluate the particular credentials, profiles, etc. associated with each authenticated user.

In various embodiments, the infrastructure 402 may be configured to transmit/push notifications to the orchestration interfaces and client devices, which may be wireless devices, via one or more networks, which may include one or more wireless channels. An application may be provided directly or indirectly by the infrastructure 402 for installation and execution by one or more devices corresponding to the orchestration interfaces and may allow for invoking, waking up, opening, and/or otherwise activating the application responsive to the pushed notifications when the device is offline and/or otherwise not online with respect to the infrastructure 402, presentation of notifications, provisioning of a user interface to allow for output of information to a user and for input from user with one or more user-selectable options. In some embodiments, a third-party notification server system may be used to send such notifications to a wireless device. An application may be provided directly or indirectly by service provider for installation and execution by the wireless device to allow for invoking, waking up, opening, and/or otherwise activating the application responsive to notifications, presentation of notifications, provisioning of a user interface to allow for output of information to a user and for input from user with one or more user-selectable options. By way of example, the infrastructure 402 may transmit such notifications and device activations to a device associated with an admin user responsive to the infrastructure 402 detecting one or a combination of critical errors in a migration process, a user attempt to detrimentally alter a migration process, multi-user conflicts where multiple users attempt to configure a migration process in conflicting manner, after the infrastructure 402 determines changes to be made to a migration plan/process (e.g., scale-down and/or scale-up adjustments disclosed herein), before or after the infrastructure 402 automatically implements such changes to alter the migration plan/process, and/or the like.

The migration infrastructure 402 may perform the migration analysis, generate the migration scripts, and/or generate the migration plan in the background. In some embodiments, the support gateway may periodically transmit performance information to the migration infrastructure 402, which can generate preemptive migration plans and migration analyses. In other embodiments, the gateway may alternatively generate the migration analysis, migration scripts, and migration plan on demand in response to a user request for data migration. These reports may correspond to migration status reports.

To run and control the migrations on a migration control server system 100-1, a special sub-directory structure may be created, with all directories created automatically during the setup procedure, to store all migration scripts, log files, scheduler-specific specifications, and/or the like. The migration control server system 100-1 may be configured to provide or may include a scheduler computer system ("scheduler") may be configured to control when migration scripts are executed by a source server system 404 and a target server system 408. The functionality of the scheduler may be implemented as a service that is deployed by the migration control server system 100-1. Given a listing of migration scripts to be executed, the scheduler may be configured to determine an order of execution to optimize the migration from the source server system 404 to the target server system 408. The scheduler may be configured to query the source server system 404 and/or the target server system 408 to determine the amount of processing resources available at each system. Based at least partially on an assessment of processing resources available, the number of and/or which migration scripts that are executed by the source server system 404 and/or the target server system 408 may be varied. The migration infrastructure 402 may expose information vie the orchestration interface about the jobs scheduled by the scheduler, such as listings, calendars, and details about current scheduled jobs, job statuses, etc.

Figure 6:
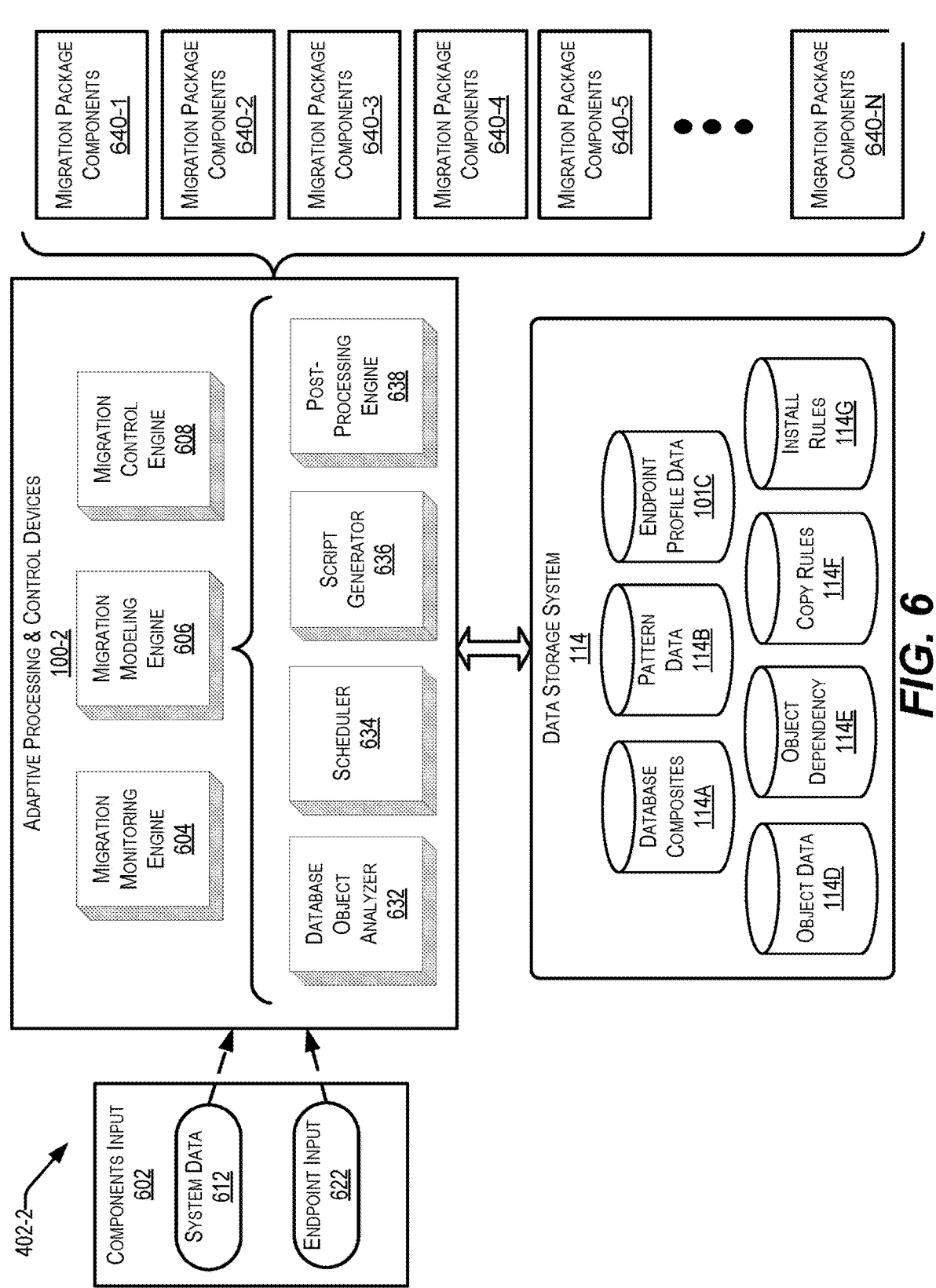
FIG. 6 illustrates a functional diagram of aspects of the adaptive migration infrastructure, in accordance with disclosed embodiments of the present disclosure.

FIG. 6 shows a functional diagram of aspects of the adaptive migration infrastructure 402, in accordance with embodiments of the present disclosure. The diagram may correspond to various portions of the adaptive migration infrastructure 402. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The migration infrastructure 402 may include one or more adaptive processing and control devices 100-2. The adaptive processing and control devices 100-2 may include and be configured to provide one or more migration monitoring engines 604, one or more migration modeling engines 606, and/or one or more migration control engines 608, one or more database object analyzers 632, one or more schedulers 643, one or more script generators 636, and/or one or more post-processing engines 638, which may be separate or integrated in various embodiments. In various embodiments, the monitoring engine 604 and/or modeling engines 606 may include one or more aggregation and/or transformation engines. In various embodiments, the adaptive processing and control devices 100-2 may correspond to a single, integral engine or separate engines working in conjunction. The adaptive processing and control devices 100-2 may transform, translate, or otherwise adjust the migration-related data collected. In various embodiments, the adaptive processing and control devices 100-2 may correspond to executable code stored in one or more memories communicatively coupled with one or more processors and/or may correspond to one or more servers of the server system configured to perform one or more of the migration features in accordance with embodiments disclosed herein.

The adaptive migration infrastructure 402 may provide a plurality of migration methods (e.g., O2O, Triple-O, RMAN, RMAN Duplicate, RMAN backup, and/or the like) that may be employed in various combinations to adaptively migrate a large plurality of source systems 404 to effect parallel migration methods that significantly accelerate migration of the source systems 404 to the target systems 408 while optimizing migrated systems as a function of a plurality of constraints and specifications. To execute the parallel migrations, the adaptive migration infrastructure 402 may generate a multiplicity of migration packages and sets of migration package components 640. Each migration package may include a collection of scripts, rules, schedules, executables, and/or the like that may be run or executed on the source system 404 and/or the target system 408 to perform the copying and installation steps of the migration. In various embodiments, each migration package and set of migration package components 640 may correspond to a set of one or more migration methods for a set of one or more databases.

The adaptive migration infrastructure 402 may perform one or more migration-balancing processes that may be based at least in part on the one or more sets of captured data that is processed, analyzed, aggregated, and augmented as disclosed herein. For example, the migration-balancing processes may be based at least in part on the components input 602, the database migration composites 114A, and/or the pattern data 114B. The migration-balancing processes for the source systems 404 and target systems 408 may be based at least in part on individual migration assessments for each of the databases. For example, the migration-balancing processes may include one or more migration method qualification processes, where each individual migration assessment may include one or more migration method qualification processes.

The migration-balancing processes may include processes for contextual determination, source determination, resource determination, and/or model determination. In some embodiments, any one or combination of such determinations may be utilized in the migration method qualification process to identify, characterize, score, categorize, and/or qualify which migration methods should be actually assigned and/or potentially assigned to particular source systems 404 and target systems 408. The adaptive migration infrastructure 402 may take into account time constraints, database migration composites 114A, and/or pattern data 114B to identify one or more parallel database migration schemes as a best fit for a particular set of source systems 404, target systems 408, and time constraints, including particular databases, platforms, particular database objects, particular criticality assessments of the same, migration method rankings and migration method categorizations/scores with respect to migration analyses and simulations disclosed herein. The features, functionalities, and abilities of the migration infrastructure 402 to dynamically shift between migration methods, learn the particularized specifications for source systems 404 and optimal target systems 408, and identify the optimal migration methods and combinations of migration methods for particular migration scenarios provide significant improvements over conventional technologies. A set of migration methods identified by the migration infrastructure 402 for a particular migration for a linked set of source systems 404 may thus be a combination of different migration methods. For example, the one or more migration control engines 608 may migrate two or more database systems in parallel with a combination of different migration methods. The parallel/simultaneous migrations of databases, along with a selected set of migration methods optimize the migration for the databases, contribute to the acceleration of migrations realized with disclosed embodiments.

In some embodiments, migration method qualification could entail a migration scoring system where databases are scored according to any one or combination of the various disclosed herein. The migration scoring system could be correlated to the category scheme in some embodiments, such that certain scores satisfying certain score thresholds correspond to certain categories, each of which may be mapped to one or more particular migration methods. Some embodiments may score databases with numerical expressions. Various embodiments may determine a migration score based on any one or more suitable quantifiers. In some embodiments, a migration score may be cumulative of individual scores based on matching each type of the characteristics. With migration scores determined, categorizations may be made based on the scores.

Migrations of a set of databases according to a subset of the migration methods may not reorganize a migrated database. Such methods may be based on operating system files and the resulting database may still need to be prepared for use of new features post migration. The resulting migration may then correspond to a system copy. By way of example, the Oracle Recovery Manager (RMAN) may be used in combination with the file copy approach. The RMAN method may provide additional migration options where RMAN converts data files according to the target specifications so that target databases 408 can run on different operating systems and storage platforms. RMAN, however, may require system downtime. Another method, such as RMAN Duplicate, may duplicate from an active database even if the source database is up and running. Methods such as RMAN and RMAN Duplicate may not change the structure of the files migrated. Accordingly, source system 404 issues, which may include file fragmentation, may be propagated to the target systems 408.

However, migrations of another set of databases according to another subset of the migration methods may reorganize the data as part of the migration. Such migration may be based on copying database objects (e.g., tables, indexes, stored procedures, views, etc.) containing data to newly created and optimized databases, tablespaces, and indexes which may be different from that which was in a source system 404, that may be created by generating scripts based on the source system 404 and running them in the target system 408. The data may be reorganized with the move. This may allow for improved features with a single step as part of the migration, such as data reorganization, partitioning, compression, encryption, including/excluding database users, renaming of database users, renaming of tablespaces, and/or the like features that improve databases migrated to the target systems 408. Hence, with disclosed migration operations, a single optimized reorganization of data may be facilitated for a migration instance that obviates the need for multiple reorganizations (e.g., 2, 3, 10, 100, or more reorganizations). Such migrations, for example, may be based on data export and import. Migration based on data export and import may correspond to offline migration, which requires a database system to be down while migration is performed. The Oracle to Oracle ("O2O") method is one example. However, some export and import migrations may be online migrations that, while being more complex, may require almost no downtime. The Oracle to Oracle Online ("Triple O") database migration is one example. Further, export/import migration methods may include full database export/import and schema-level export/import, where schemas may include collections of database objects logically mapped together, e.g., based on owner and/or one or more other attributes.

Some methods, such as RMAN Backup or RMAN Duplicate, may be relatively faster and/or may be suitable for particular size ranges. Some methods may be suitable for a smaller system in view of more demanding time constraints—e.g., exports/imports of the database in the pooled database export mode or the schema level mode. Moreover, different methods may allow for changes during a migration of source systems 404 to target systems 408. For example, a schema-level migration may allow for intra-migration changes such as including/excluding database users, renaming of database users, renaming of tablespaces, and/or the like. Different such methods may allow for different sets of features such as the possibility to perform consolidation steps, which might be required as part of the migration project. Possible scenarios may include database consolidations and moving database users into separate pluggable databases (PDBs).

Each of the various migration methods may employ a combination of technologies that make them as fast, flexible, and reliable as possible, while each may have particular advantages, features, and drawbacks that the migration infrastructure 402 may factor into migration analyses for particular source systems 404, target systems 408, and individual client customizations. In so doing, the migration infrastructure 402 may adapt the parallel migrations to particularities of a given source system 404. Database sizes may be correlated to a greater (or lesser) migration score. However, while the system factors into the migration analyses database size, database size may not be primary criteria and may not be as heavily weighted as other factors, and thus may not contribute to the overall migration score as other factors. Various factors may be weighted differently. Primary criteria may include determining which subset of the plurality of migration methods may be used to migrate a given database, which should be used to self-correct issues (e.g., in view of the above-described factors that indicate a need for more than simply copying databases, such as reorganization, etc.), migration time and corresponding downtime for the particular database and each particular migration method of the subset of migration methods, client-specified constraints (e.g., time constraints on migration time and/or downtime, selections of operating systems, platforms, hardware, applications, security specifications and functions, etc.), and/or the like criteria disclosed herein.

Thus, for example, time constraints may be correlated to a greater (or lesser) migration score. A more stringent time constraint (e.g., client specifications with user-selectable options of the migration user interface that correspond to relatively shorter allowable downtime) may be correlated to a lesser (or greater) migration score and one or more corresponding categories of migration methods that require less downtime, but offer fewer additional features. Similarly, a client specification of no allowable downtime may be correlated to a greater (or lesser) migration score and one or more corresponding categories of migration methods that require no downtime, but may require more overall migration time to completion.

Further, as disclosed herein, the modeling engine 606 may determine whether and to what extents databases have various performance and/or integrity issues, which issues may be indicated by the database migration composites 114A and/or the pattern data 114B. Databases which the modeling engine 606 determines to have greater extents/severities of issues (e.g., greater extents of fragmentation satisfying one or more fragmentation thresholds) may be correlated to a greater (or lesser) migration score and one or more corresponding categories of migration methods that include reorganization and correction of the issues. Conversely, databases which the modeling engine 606 determines to have lesser extents of issues (e.g., below one or more fragmentation thresholds) may be correlated to a lesser (or greater) migration score and one or more corresponding categories of migration methods that do not include reorganization and issue correction.

Additionally, the importance/criticalities of a particular database which the modeling engine 606 may determine based at least in part on its analyses of the database, criticalities of its database objects, criticality attributes, criticalities of any cross-database dependencies, client specifications of importance/criticalities, and/or the like may be correlated to a greater (or lesser) migration score, with such contribution being weighted to affect the overall migration score more heavily. Thus, for example, a given database that may have only a moderate or light extent fragmentation may be accorded a migration score corresponding to one or more non-restructuring migration methods when it determined to have low importance/criticality, but may be accorded a migration score corresponding to one or more restructuring migration methods when it determined to have high importance/criticality. Accordingly, the system-determined migration plan may include one or more system-selected migration methods identified as the best one or more migration methods based at least in part on rule sets used by the modeling engine 606 that take into account the factors disclosed herein, database migration composites 114A, and pattern data 114B.

The adaptive processing and control devices 100-2 may be communicatively coupled with interface components and communication channels, which may take various forms in various embodiments as disclosed herein, configured to receive components input 602. The monitoring engine 604 may be configured to monitor the components input 602 for any suitable aspects to facilitate the migration features disclosed herein. The components input 602 may include input from a plurality of different data sources. The technical improvements provided by the migration infrastructure 402 over prior technologies include improvements in speed of migrating multiple database systems, performance of parallel/simultaneous migrations of multiple database systems, migration adaptability to particular source systems 404 and target systems 408, and parallel database migration control, at least in part by machine-intelligent handling of input from multiple different sources, including the source server systems 404, the target server systems 408, and endpoint interfaces. As depicted, the components input 602 may include system data 612 and/or endpoint data 622. The migration infrastructure 402 may process and analyze system data 612 and/or endpoint data 622 to provide for features disclosed further herein.

The endpoint device input 622 may include input from one or more endpoint devices 102-108, 204-208, which could correspond to input from one or more other sources that may include input from an administrator device and/or another network-accessible endpoint accessing the migration infrastructure 402 via the orchestration interface. In various embodiments, the system data 612 from the source server systems 404 and/or the target server systems 408 may be retrieved and/or received by the devices 100-2 via one or more data acquisition interfaces, which may include interfaces of the one or more adaptive processing devices 100-2, components of the source server systems 404 and/or the target server systems 408, and/or the like-through network(s) 210, through suitable means for direct communication, and/or through any other suitable means of transferring data. According to disclosed embodiments, the system data 612 pulled and/or pushed from the source server systems 404 and/or the target server systems 408 by the agents disclosed herein. The system data 612 may be transformed and the transformed data and/or other data generated based thereon may be made available by the one or more adaptive processing devices 100-2. In some embodiments, the one or more data acquisition interfaces may include one or more APIs that define protocols and routines for interfacing with the source server systems 404 and/or the target server systems 408. The APIs may specify API calls to/from data source components and/or systems. In some embodiments, the APIs may include a plug-in to integrate with one or more applications of the source server systems 404 and/or the target server systems 408. The one or more data acquisition interfaces, in some embodiments, could use a number of API translation profiles configured to allow interface with the one or more additional applications of the source server systems 404 and/or the target server systems 408. The API translation profiles may translate the protocols and routines of the data source component and/or system to integrate at least temporarily with the system and allow communication with the migration infrastructure 402 (one-way communication to the system and/or two-way communication with system in various embodiments) by way of API calls.

The components input 602 (e.g., system data 612) pulled and/or pushed from the source systems 404 and the target systems 408 may include one or a combination of information from the source systems 404, including information on data objects to be migrated to the target systems 408, source/target information (e.g., database specifications, metrics, attributes, configuration data, and/or the like), operating system configurations, performance and production workload information related to the source systems 404 and/or the target systems 408, data on the amount of processing resources available at each system, monitored data migration processes (e.g., per execution of migration scripts that are executed by the source server system 404 and/or the target server system 408), data on detected events (e.g., a database going offline, peak events that consume resources that may impact a migration, and/or the like), and/or the like. System data 612 may be gathered from the databases in real time, periodically, or when triggered by certain events with respect to the particular databases. For example, the migration infrastructure 402 may aggregate system data 612 periodically, according to a schedule. Additionally, the migration infrastructure 402 may aggregate system data 612 in response to user access of the orchestration interface. For example, when a user accesses the interface and one or more databases are selected, the migration infrastructure 402 may aggregate system data 612 from databases to refresh and/or update system data 612 previously gathered in order to generate visualizations for the one or more databases with the updated data.

Based at least in part on the components input 602 (e.g., system data 612 including retrieved database-specific specifications and the pulled database data), the migration infrastructure 402 (e.g., the modeling engine 606) may model each database, where each model may correspond to a database profile, database metrics, and database specifications for the corresponding database and the modeled migration of the corresponding database. The migration infrastructure 402 may store the models such that the database migration composites data 114A include the models. Each database migration composite 114A may include or be a database profile corresponding to a particular source database 404 and/or particular target database 408, and may include particularized mappings of the particular source database 404 to one or more target databases 408. Further, each database migration composite 114A may include or be a migration model for the particular database(s), to facilitate further migration analysis with respect to the database, to facilitate migration simulation that includes the particular database(s), to facilitate emulation of the particular database(s), and/or the like. Using the system data 612 and database migration composites 114A, the migration infrastructure 402 (e.g., the modeling engine 606 and/or an interface engine) may create a visualization and graphical representation formatted to emulate the particular source database(s) 404, target database(s) 408, and/or migration(s) of the one or more source databases 404 to the one or more target databases 408. In various embodiments, the database migration composite 114A for the particular database(s) may include or otherwise be mapped to pattern data 114B for the particular database(s).

The database modeling engine 606 may include or otherwise correspond to a learning engine that may employ an ongoing learning mode to create, confirm, correct, and/or refine pattern data 114B for particular components (e.g., databases) of the source systems 404, the target systems 408, and/or migrations from the source systems 404 to the target systems 408. The database modeling engine 606 may be an analysis and matching engine that employs machine learning to process the components input 602 (e.g., system data 612 and/or endpoint input 622) and derive the particularized pattern data 114B. The database modeling engine 606 may be configured to perform any one or combination of features directed to matching or otherwise correlating system data 612 and/or endpoint input 622. The database modeling engine 606 may include logic to implement and/or otherwise facilitate any taxonomy, classification, categorization, correlation, mapping, qualification, scoring, organization, and/or or the like features disclosed herein. In various embodiments, the database modeling engine 606 may be configured to analyze, classify, categorize, characterize, tag, and/or annotate the components input 602. The database modeling engine 606 may employ one or more artificial intelligence (machine learning or, more specifically, deep learning) algorithms to perform pattern matching to detect patterns of the data for the databases.

The analyses performed by the migration infrastructure 402 may include analyzing the source databases 404 and to identify ways in which they can be reconfigured on the target databases in order to optimize performance. This modeling service may provide an analysis of how the data objects on the source system 404 can be configured to operate on the target database systems 408. For example, the modeling service may provide recommendations that certain databases should be combined onto a single system, such as an Exedata system from Oracle™. This may be part of a Platform-as-a-Service (PaaS) and/or a Database-as-a-Service (DaaS) product, where the cloud service can combine several databases into a single database on a managed platform. The analyses performed by the migration infrastructure 402 may include categorizing objects, identifying objects that require special handling during migration, identifying invalid objects, analyzing the usage and criticality of objects, and/or the like. The source system 404 analysis may also identify large database objects that need further configuration to achieve efficiencies and storage using existing technologies, such as partitioning and compression. The migration analysis may use data collected by the agents so that the migration infrastructure 402 may model the databases and configure a migration plan that, among other things, minimizes downtime, maximizes transfer speeds, and ensures data integrity and validation (ensuring that all of the data has been transferred). The migration plan may include a plurality of migration scripts that can be executed in parallel, reordered, scheduled, and configured as to the sources, targets, compression, partitioning, ownership, and/ or location of the data according to the migration plan and any client-specified parameter inputs and constraints.

The migration analysis may also include identification and classification of a plurality of objects stored within the source databases 404. For example, the migration analysis may identify invalid objects in the source databases 404 that can be verified against invalid objects in the target databases after migration has taken place. The migration analysis may also identify and self-correct issues, such as exceptionally large database tables that may need to be subdivided into smaller units and/or compressed. The migration analysis may also identify objects associated with security requirements, maximum offline requirements, data integrity requirements, redundancy requirements, and/or the like that would require special handling during the migration procedure.

The migration analysis may also identify database options in the source databases 404 and determine how to translate those options to the target databases 408. For example, source databases may include an automatic storage management (ASM) feature, and the options thereof may need to be configured to run on the target database system 408. This also allows for a source system 404 that does not use ASM to use ASM in the target database configuration. The migration analysis may also provide for compression, encryption, and/or other data transformation options that may be recommended to users or required by the target database systems 408. For example, the migration analysis may provide space and cost savings that may be attained by implementing a particular data compression scheme.

As part of the parallel database migration analyses and planning, the modeling engine 606 may predict migration time and corresponding downtime for each particular database of the plurality of databases of the source systems 404 for each potential migration method of the plurality of migration methods that could be used for the particular database (e.g., O2O, Triple-O, RMAN, RMAN Duplicate, RMAN backup, and/or the like). The migration analysis interface may expose analysis statuses, analysis results, and various parameters pertaining to the migration analyses and planning, along with presenting user-selectable options to edit and modify values of the various parameters. The interface may identify each database of the source systems 404 with system identification, hostname, database name, database version, character set, database size, table sizes and numbers, index sizes and numbers, and/or the like details. Further, the interface may identify statuses and results of the analyses of each database that may include predicted migration time with respect to each migration method, estimated in view of the details gathered for each database migration. For example, the interface may indicate estimated O2O time, estimated Triple-O time, estimated RMAN time, estimated RMAN Duplicate time, estimated RMAN backup time, and/or the like. Such migration time predictions may be a function of one or a combination of any of the factors disclosed herein, such as database metrics (e.g., size); performance metrics (e.g., GB/h) for export performance, network speed, and import performance; extents of the needs for reorganization; amounts of processing resources available at each system; and/or the like.

The migration infrastructure 402 may utilize the pattern data 114B to significantly accelerate migration of the source systems 404 to the target systems 408 while optimizing the migrated systems in view of a plurality of constraints and specifications. The pattern data 114B may be used to efficiently handle sets of source databases 404 that the modeling engine 606 identifies as linked by common pattern data 114B. For example, the modeling engine 606 may link together certain source databases 404 that the modeling engine 606 identifies as having common pattern data 114B that may include patterns (and corresponding categories) of database metrics, database specifications, database configuration data and parameters, operating system configurations, information on data objects to be migrated to the target systems 408, and/or the like. By way of further example, the particularized pattern data 114B for particular databases may include patterns (and corresponding categories) of conditions, operations, and attributes mapped to a particular database, such as performance data, production workload data, patterns of change of such aspects as a function of time and corresponding temporal data), time constraints (downtimes of 8 hours, 1 hour, 30 minutes, etc.) limiting migrations of systems and system components, recovery times, migration times, importance/criticalities of the particular database, amount of processing resources available at each system, monitored data migration processes, data on detected events, corresponding categories, corresponding rules, and/or the like.

To facilitate the linking, the modeling engine 606 may perform correlation based at least in part on correlation rules that govern correlation of the data corresponding to the database migration composites 114A and/or pattern data 114B. The correlation rules may include correlation criteria that could include specifications of the various categories of corresponding data. The criteria may specify rules for matching the various categories based at least in part on matching one or combination of values, identifiers, ranges of the values or identifiers, specifications of complimentary range or groupings, and/or like correlation information for the categories of data corresponding to the database migration composites 114A and/or pattern data 114B. In addition or in alternative, the correlation rules may include correlation criteria that could include keywords identified by any one or combination of words, word stems, phrase, word groupings, and/or like keyword information. The correlation criteria could include weightings assigned to the different categories. In various embodiments, the modeling engine 606 may employ a scoring system to correlate the different categories. Various embodiments may quantify correlations with a numerical expression, for example, a match score, with higher scores being assigned to higher correlations of the categories and/or corresponding values, identifiers, etc. Higher scores may be assigned for greater extents of matching. For example, a match of three top-ranked categories and/or corresponding values, identifiers, etc. may be assigned a higher score than a match of only one top-ranked category and corresponding values, identifiers, etc. As another example, an exact match may be assigned a higher score than a complimentary match (e.g., where absent an exact match, a category and/or corresponding values, identifiers, etc. are defined as a complement to another category and/or corresponding values, identifiers, etc.). Hence, closeness of matching may be a basis for scoring. Some contingencies could be implemented so that only a threshold correlation needs be identified. For example, if a sufficiently close match is found on the basis of one category to meet the threshold, the matching content item may be selected. But, if a sufficiently close match is found on that basis, one or more of the buckets may be used as a basis to identify a stronger pattern match.

Each database migration composite 114A and/or set of pattern data 114B linked to a particular database migration composite 114A may include baseline attributes for the determined patterns, categories, and/or rules attributed to a particular database and monitored conditions of the database. Subsequently detected data may be used, in conjunction with previously detected data, to adjust a database migration composite 114A and/or linked set of pattern data 114B. For example, baseline detected performance data, load data, temporal data, configuration data, and/or parameters may be attributed to, and/or used to refine attributes for, the database and database migration, and one or more subsequent detections may be compared to the baseline readings and/or attributes to determine changes between the baselines and the subsequent readings and/or attributes. Such differences may be used to develop the database migration composite 114A and/or cross-referenced set of pattern data 114B.

In some embodiments, the modeling engine 606 may be configured to employ deep learning to process the system data 612 and derive particularized pattern data 114B. The particularized pattern data 114B may include one or more patterns determined by the modeling engine 606 for particular components (e.g., databases) of the source systems 404, the target systems 408, and/or migrations from the source systems 404 to the target systems 408. Accordingly, the database modeling engine 606 may facilitate machine learning or, more specifically, deep learning, to facilitate creation, development, and/or use of particularized pattern data 114B. The database modeling engine 606 may include a reasoning module to make logical inferences from a set of the detected and differentiated data to infer one or more patterns for particular databases. A pattern-based reasoner may be employed to use various statistical techniques in analyzing the data, current and/or historical, in order to infer particularized pattern data 114B from the observation data 612. A transitive reasoner may be employed to infer relationships from a set of relationships related to the observation data 612. In various embodiments, the system automatically establishes and develops the particularized pattern data 114B.

In some embodiments, when the database modeling engine 606 has come to one or more conclusions as part of the modeling disclosed herein, the one or more adaptive processing devices 100-2 (e.g., the control engine 608) may confirm and/or correct the determinations with feedback loop features. Certain embodiments may provide one or more endpoint devices with feedback options to facilitate the ongoing learning mode. User-selectable options (e.g., via the orchestration interface or another device interface) provided with notifications (e.g., push notifications to the endpoint device, pop-up/modal windows with the orchestration interface, and/or the like) could be provided to allow administrative confirmation or correction of conditions detected. The feedback could be used for training the system to heuristically adapt conclusions, database specifications, correlations, attributes, triggers, patterns, and/or the like.

For each set of the linked sets of source databases 404, the modeling engine 606 and/or the control engine 608 may further create a migration plan and generate migration scripts for the migration of the set. With the modeling engine 606 and/or the control engine 608 configuring, preparing, and setting up migration for the set, efforts and operations for the migration may be reduce as compared to otherwise individual migrations for individual databases. For each set, a common plan, configuration, preparation, and setup may include specifying one or a combination of all parameters, migration methods, reorganizations, partitioning, compression, encryption, including/excluding database users, renaming of database users, renaming of tablespaces, client-specified constraints (e.g., time constraints on migration time and/or downtime, selections of operating systems, platforms, hardware, applications, security specifications and functions, etc.), and/or the like. Such greatest common global specifications, setup objects, and script creation, definition, and handling may be performed for as many systems as possible based at least in part on the linking. In some embodiments, a replication and propagation engine may be configured to perform the replication and reuse of the foregoing, and the modeling engine 606 and/or the control engine 608 may include or otherwise be integrated with replication and propagation engine in various embodiments. By way of example with respect to parameters, the parameters may be the same for as many systems as possible. This could be either an exact setting or a common string (e.g. directory name), which is reused throughout many systems. These global parameter settings may be copied to each target host. Then, the parameters may become host-specific and may be particularized for all systems, created on the host. This may reduce the need to specify parameters, which are common for many or all the linked systems on the host, over and over again. Ultimately, the final systems on the host may be provided with a copy of the host-specific parameters to define all system-specific settings. Hence, using this approach, the migration infrastructure 402 may facilitate the significant reduction of efforts, operations, time, and resources needed to configure the systems. With global migration parameters defined and parameter values set as common for a linked set of systems, the parameters may be used to configure the generation of migration scripts and include settings which influence the database definition on the target system 408, e.g., path to data files, migration scripts, dump files, etc. Some of the parameters may be common for many systems.

The migration control engine 608 may be configured to carry out the parallel migrations according to the one or more migration plans created by the modeling engine 606. The migration control engine 608 may be configured to control the execution of the one or more parallel migration plans such that the migration scripts are carried out in the sequences and parallelization specified by the one or more parallel migration plans. The modeling engine 606 may develop the migration plans as a function of the system-examination of the selected migration methods, amounts of processing resources and capacities available at each system, database metrics, export performance, network speed, import performance, and/or the like. Thus, for example, a composite migration plan may specify 10, 20, 50, 100, or more parallel migrations for 10, 20, 50, 100, or more databases depending on the system-examination.

In controlling the execution of the parallel migrations, the migration control engine 608 may dynamically adjust the execution in order to scale the number of parallel migrations and, hence, the parallel processing and network usage, up or down during the migration runs. The dynamic adjustment may be based at least in part on one of the engines 604, 606, 608 analyzing currently monitored indicia of processing resources and capacities available at each system, database metrics, export performance, network speed, import performance, with the control engine 608 then scaling the parallel migrations in order to optimize the execution so that the migration time targets will be attained for the greatest number of databases and/or the most important/critical databases, within time windows of the predicted completion times for those databases. For example, in some embodiments, one of the engines may rank the databases according to importance/criticalities, which may be determined by ranking the importance/criticalities scores of the databases. Then, in the case of a scale-down adjustment, one or more of the migrations for one or more of the lowest ranked databases may be paused, interrupted, or terminated to allow the balance of the database migrations to continue in accordance with the predicted time line. After completion of the top-ranked migrations, the control engine 608 may resume or restart such paused, interrupted, or terminated migrations. In the case of an opportunistic scale-up adjustment, the control engine 608 may add one or more migrations corresponding to the one or more next-ranked databases with migrations not already running in the parallel scheme.

In some embodiments, the migration control engine 608 may further scale the parallel migrations by switching the migration methods of one or more databases. Thus, for example, a given database that may have a migration score within a certain range of, or that is closest to, a threshold that corresponds to a certain category for a restructuring migration method may be assigned a different migration method, such as a non-restructuring migration method, in order to lessen migration time and resource usage allow the balance of the database migrations to continue in accordance with the predicted time line and the planned migration methods. The migration control engine 608 may make an exception for databases having a high importance/criticality score and/or attribute, and may select the next-closest databases that do not have a high importance/criticality score and/or attribute for migration method alteration. In the case of an opportunistic scale-up adjustment, the control engine 608 may change one or more migration methods of databases having a migration score within a certain range of, or that is closest to, a threshold that corresponds to a certain category for a restructuring migration method (without otherwise the threshold) may be assigned a restructuring migration method. Accordingly, consequent to automated system-examination of resources and capacities, the migration infrastructure 402 may expand or contract parallel migrations, effectively altering parallel migration plans during run time, in order to optimize the migrations in real time and meet or beat the system predictions.

Further elaborating on the details of effecting the migrations by the migration service provided by the infrastructure 402, the migration service may generate a migration package that may be used to perform the copy and install steps of the migration. The migration package may be used by the service, another service, or executed or initiated independently to execute the next steps of migration. The migration package may include scripts, analysis of database objects, a schedule for executing or running the scripts, exceptions or possible incompatibilities in the migration, and/or control files for ordering or scheduling the copy and install steps of the migration. The scripts, schedule, and analysis of objects may be used to perform the copy and install steps of migration.

The scripts that the migration service generates may specify the how to copy or install one or more database objects. They may specify particular procedure used for the copy or install of a specific database object. The schedule may further define the order or the dependencies of the database objects and scripts. The schedule may define the order that the scripts may need to be executed, which scripts may be run in parallel, and the like. The object analysis output may include additional dependencies between objects and/or users schemas may be used by other services or tools in the migration process.

The operations defined in the scripts, the schedule of the scripts and the like may be optimized by the migration service. The service may automatically optimize the scripts and schedule and operations defined in the scripts to reduce the time required to perform the copy and install steps of the migration compared to a copy and install operation that copies and installs the database objects in a series. In some instances, the optimization may include a reduction in size, reduction in computation resources to perform the copy and install operations, and/or the like.

The migration service may perform analysis on the database objects to determine the copy and install operation that are the most appropriate for the type or size of the database object. The migration service may include a database object analyzer 632, which may be integrated with the migration modeling engine 606 in some embodiments. The database object analyzer 632 may be used to determine the properties of the objects in the database, how big these objects are, and/or dependencies. For each object or a collection of database objects the database object analyzer 632 may determine an appropriate method for copying and installing the object in the target system. For example, each database object, or a collections of objects, the database object analyzer 632 may choose a copy operation which may include export data dump, export, create table as select, and/or the like.

In some embodiments, the migration service may include copy rules 114F and/or install rules 114G. The copy 114F and install 114G rules may define the preferred or optimal operations to use for copy and install operations based on the type of database object, the size of the object, the characteristics of the source or target server, and/or the like. The database object analyzer 632 may determine the database object characteristics. The database object analyzer 632 may query the copy rules 114F and/or the install rules 114G with the database object characteristics to determine a preferred copy and/or install operation for the object, and the source or target system. For example, based on the availability of bandwidth of the communication channel between the source and target servers, the copy rules may return a specific copy operation based on the size of the database object for communication channels with low bandwidth. The copy operations for large objects may include a compression operation prior to transmitting the large object over the communication channel.

In embodiments, the copy and install rules 114F, 114G may provide more than one copy and install operations for each object. Different copy and install operations may be defined based on the optimization criteria for the migration. In embodiments the copy and install rules may be based on empirical tests and/or predicted performance. The rules may be developed from tests for each type of operation on different object types. The tests may be measured for their completion times, resource requirements, and complexity. The copy and install rules may be selected from the tests. In other embodiments the copy and install rules may be developed by the migration service by performing a series of copy and install test operations using the source and target servers. The migration service may perform a series of test copy and install operations using a set of test database objects. The migration service may measure the time to perform these operations, the resources used, and/or the like. Based on the tests the migration service may develop a set of copy 114F and install 114G rules to use for the specific migration. In embodiments, the copy rules 114F and install rules 114G may include a specific execution order, a sequence or routine of two or more steps on the target to create the object and/or to import the data.

The object analyzer 632 may analyze each object to determine if it may be recreated from other objects. Some database objects may be redundant, or may be supporting database objects that are generated from other database objects. The redundant database objects may not be copied to the target but instead recreated at the target from other database objects. For example, a database object may include an index. Indexes may allow for faster and/or more efficient querying of the database. In some embodiments indexes cannot be copied, they must be recreated on the target system. The object analyzer 632 may define how to recreate database objects at the target server and may include instructions and methods on the most efficient ways and order to recreate these objects.

The migration service may further include a scheduler module 634. The scheduler module 634 may analyze the dependencies of the database objects. Some database objects may be related to other database objects. In some cases, some database objects may not be copied or installed until one or more other database objects have been copies and installed. The dependencies may be determined by the scheduler 634. The scheduler may build a schedule and/or control files that capture an order the objects may be copies and installed during migration. The schedule and/or control files may provide for a defined order of execution of the scripts generated by the migration service. In some embodiments, the schedule and/or control files generated by the scheduler 634 may identify the dependencies and/or only identify database objects or operation that may be performed in parallel or simultaneously. In embodiments, the scheduler 634 may generate a control structure which may enable another service or tool to find an optimum sequence or schedule for the migration run.

For example, when the scheduler 634 identifies an index as a database object the scheduler may identify other tables, views, or data the index references (e.g. foreign key constraints). Foreign key constraints, for example, can only be created if the index they depend on already exists in the target system. The some embodiments the scheduler may generate a schedule specifying that the scripts used to copy and install database objects that are referenced by the index have to be executed first prior to the script that recreates the index at the target server. In embodiments the dependencies may include, for example, database types, functions, primary key constraints, foreign key constraints, procedures, referenced either in the same schema or a different user schema.

The migration service may further include a post processing engine 638 to determine additional operations required for each database object during migration. In embodiments database objects may be transformed, compressed, reformatted, partitioned into multiple objects, and/or the like. In some embodiments the target server database system may include new features or requirements. The new features or requirements may require a transformation of the database objects or a change of the structure of the database objects. In some embodiments changes to database objects may be performed to increase database performance, reduce the storage requirements for the database object, change organization of data, and the like. The post processing engine 638 may analyze the migration parameters and/or the database information received by the migration service to determine post processing operations.

The post processing engine 638 may be used change the table space layout, table contents, data values, data formats, and the like. Changes in the data structure that may normally be difficult to make when a database is online may be made during migration. For example all database objects associated with one user on the source system may be changed to be associated with a different user on the target system.

The output of the database object analyzer 632, scheduler 634, and the post processing engine 638 may be used by the script generator 636 to generate the scripts. A script may define the copy and install operations for one or more database objects. For some objects that are not copied, the script may define operations for recreating the object at the target system 408. A script may be generated for every database object that is migrated. In some embodiments the script may define operations for more than one database object. The script generator 636 may be configured to group the definitions for one or more migration operations into one script. In some embodiments, the migration operations for a single database object may be split into more than one script. Splitting the operations may be beneficial for very large objects allowing more scheduling configurations.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms "computer-readable medium," "computer-readable media," "processor-readable medium," "processor-readable media," "machine-readable medium," and "machine-readable media," include, but are not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A computer-implemented method comprising:
accessing, by an adaptive migration infrastructure that includes one or more processors, information associated with a plurality of source databases and a plurality of target databases, wherein the information includes performance data, configuration data, client-specified constraints, or production load;
analyzing, by the adaptive migration infrastructure, the information associated with the plurality of source databases and the plurality of target databases;
determining, based on the analyzing of the information, a migration score for each source database of the plurality of source databases;
generating a plurality of linked sets of the plurality of source databases based at least in part on the migration score for each source database of the plurality of source databases;
selecting, for each set of the plurality of linked sets of the plurality of source databases, one or more migration methods based at least in part on a migration score range associated with the set;
generating, for each set of the plurality of linked sets and by the adaptive migration infrastructure, a migration plan that specifies parallel migration of two or more source databases by utilizing the one or more migration methods associated with the set, wherein the migration plan includes a plurality of migration scripts;
initiating, by executing the plurality of migration scripts using the adaptive migration infrastructure, the parallel migration of the two or more source databases to one or more target databases of the plurality of target databases;
monitoring, by the adaptive migration infrastructure, the parallel migration in real time;

detecting, by the adaptive migration infrastructure, one or more conditions comprising a critical error in the migration plan and/or a user attempt to alter the migration plan; and implementing, by the adaptive migration infrastructure and in response to the detection of the one or more conditions, dynamic adjustments to the migration plan.

2. The computer-implemented method of claim 1, wherein the migration score for each source database of the plurality of source databases comprises a weighted sum of individual scores corresponding to different factors or characteristics that include database metrics, database specifications, the configuration data, information on data objects to be migrated, and the client-specified constraints.

3. The computer-implemented method of claim 2, wherein the individual scores corresponding to the different factors further include an extent of reorganization and processing of the data objects to be migrated through reordering, partitioning, compression, encryption, or fragmentation.

4. The computer-implemented method of claim 1, wherein generating the plurality of linked sets of the plurality of source databases further based on correlation based scoring.

5. The computer-implemented method of claim 1, wherein monitoring the parallel migration in real time further includes:

receiving, by the adaptive migration infrastructure, one or more signals relating to the monitoring of one or more ongoing operations of the parallel migration, wherein the one or more signals correspond to indications of:

processing resources or capacities available at a source system or a target system, database metrics of at least one database of the plurality of source databases or at least one database of the plurality of target databases, and export performance, import performance, or network speed.

6. The computer-implemented method of claim 1, further comprising: generating, by the adaptive migration infrastructure, recommendations based on the analyzing of the information, wherein the recommendations include combining specific source databases into a single database, a partitioning of a particular source database, a compression of a particular source database, or an indication of invalid objects in a source database.

7. The computer-implemented method of claim 1, wherein the client-specified constraints include selections of operating systems, platforms, hardware, security specifications, or time constraints including a downtime and a migration time.

8. The computer-implemented method of claim 1, wherein the adaptive migration infrastructure is located remotely from the plurality of source databases and the plurality of target databases and is configured to provide a cloud-based migration service.

9. A system comprising:

one or more data processors; and a non-transitory computer-readable storage medium containing instructions which, when executed on the one or more data processors, cause the one or more data processors to perform a set of operations including:

accessing, by an adaptive migration infrastructure that includes one or more processors, information associated with a plurality of source databases and a plurality of target databases, wherein the information includes performance data, configuration data, client-specified constraints, or production load;

analyzing, by the adaptive migration infrastructure, the information associated with the plurality of source databases and the plurality of target databases;

determining, based on the analyzing of the information, a migration score for each source database of the plurality of source databases;

generating a plurality of linked sets of the plurality of source databases based at least in part on the migration score for each source database of the plurality of source databases;

selecting, for each set of the plurality of linked sets of the plurality of source databases, one or more migration methods based at least in part on a migration score range associated with the set;

generating, for each set of the plurality of linked sets and by the adaptive migration infrastructure, a migration plan that specifies parallel migration of two or more source databases by utilizing the one or more migration methods associated with the set, wherein the migration plan includes a plurality of migration scripts;

initiating, by executing the plurality of migration scripts using the adaptive migration infrastructure, the parallel migration of the two or more source databases to one or more target databases of the plurality of target databases;

monitoring, by the adaptive migration infrastructure, the parallel migration in real time;

detecting, by the adaptive migration infrastructure, one or more conditions comprising a critical error in the migration plan and/or a user attempt to alter the migration plan; and implementing, by the adaptive migration infrastructure and in response to the detection of the one or more conditions, dynamic adjustments to the migration plan.

10. The system of claim 9, wherein the migration score for each source database of the plurality of source databases comprises a weighted sum of individual scores corresponding to different factors or characteristics that include database metrics, database specifications, the configuration data, information on data objects to be migrated, and the client-specified constraints.

11. The system of claim 10, wherein the individual scores corresponding to the different factors further include an extent of reorganization and processing of the data objects to be migrated through reordering, partitioning, compression, encryption, or fragmentation.

12. The system of claim 9, wherein monitoring the parallel migration in real time further includes:

receiving, by the adaptive migration infrastructure, one or more signals relating to the monitoring of one or more ongoing operations of the parallel migration, wherein the one or more signals correspond to indications of:

processing resources or capacities available at a source system or a target system, database metrics of at least one database of the plurality of source databases or at least one database of the plurality of target databases, and export performance, import performance, or network speed.

13. The system of claim 9, the set of operations further comprises:

generating, by the adaptive migration infrastructure, recommendations based on the analyzing of the information, wherein the recommendations include combining specific source databases into a single database, a partitioning of a particular source database, a compression of a particular source database, or an indication of invalid objects in a source database.

14. The system of claim 9, wherein the client-specified constraints include selections of operating systems, platforms, hardware, security specifications, or time constraints including a downtime and a migration time.

15. The system of claim 9, wherein the adaptive migration infrastructure is located remotely from the plurality of source databases and the plurality of target databases and is configured to provide a cloud-based migration service.

16. A computer-program product tangibly embodied in a non-transitory machine-readable storage medium, including instructions configured to cause one or more data processors to perform a set of operations comprising:

accessing, by an adaptive migration infrastructure that includes one or more processors, information associated with a plurality of source databases and a plurality of target databases, wherein the information includes performance data, configuration data, client-specified constraints, or production load;

analyzing, by the adaptive migration infrastructure, the information associated with the plurality of source databases and the plurality of target databases;

determining, based on the analyzing of the information, a migration score for each source database of the plurality of source databases;

generating a plurality of linked sets of the plurality of source databases based at least in part on the migration score for each source database of the plurality of source databases;

selecting, for each set of the plurality of linked sets of the plurality of source databases, one or more migration methods based at least in part on a migration score range associated with the set;

generating, for each set of the plurality of linked sets and by the adaptive migration infrastructure, a migration plan that specifies parallel migration of two or more source databases by utilizing the one or more migration methods associated with the set, wherein the migration plan includes a plurality of migration scripts;

initiating, by executing the plurality of migration scripts using the adaptive migration infrastructure, the parallel migration of the two or more source databases to one or more target databases of the plurality of target databases;

monitoring, by the adaptive migration infrastructure, the parallel migration in real time;

detecting, by the adaptive migration infrastructure, one or more conditions comprising a critical error in the migration plan and/or a user attempt to alter the migration plan; and implementing, by the adaptive migration infrastructure and in response to the detection of the one or more conditions, dynamic adjustments to the migration plan.

17. The computer-program product of claim 16, wherein the migration score for each source database of the plurality of source databases comprises a weighted sum of individual scores corresponding to different factors or characteristics that include database metrics, database specifications, the configuration data, information on data objects to be migrated, and the client-specified constraints.

18. The computer-program product of claim 17, wherein the individual scores corresponding to the different factors further include an extent of reorganization and processing of the data objects to be migrated through reordering, partitioning, compression, encryption, or fragmentation.

19. The computer-program product of claim 16, wherein monitoring the parallel migration in real time further includes:

receiving, by the adaptive migration infrastructure, one or more signals relating to the monitoring of one or more ongoing operations of the parallel migration, wherein the one or more signals correspond to indications of:

processing resources or capacities available at a source system or a target system, database metrics of at least one database of the plurality of source databases or at least one database of the plurality of target databases, and export performance, import performance, or network speed.

20. The computer-program product of claim 16, the set of operations further comprises:

generating, by the adaptive migration infrastructure, recommendations based on the analyzing of the information, wherein the recommendations include combining specific source databases into a single database, a partitioning of a particular source database, a compression of a particular source database, or an indication of invalid objects in a source database.

* * * * *